US012776943B2

(12) United States Patent
Berriel et al.

(10) Patent No.: US 12,776,943 B2
(45) Date of Patent: Oct. 27, 2026

(54) IDENTIFYING FIREWALL ISSUES IMPACTING COMMUNICATION SESSIONS

(71) Applicant: Zoom Communications, Inc., San Jose, CA (US)

(72) Inventors: William Flanagan Berriel, Brooklyn, NY (US); Jeffrey Allen Eagan, Longmont, CO (US); Jamie Allen Fitterer, Bozeman, MT (US); Michael Ray Garrett, Spring, TX (US); James Neal Martin, Riverview, FL (US)

(73) Assignee: Zoom Communications, Inc., San Jose, CA (US)

( * ) Notice: Subject to any disclaimer, the term of this patent is extended or adjusted under 35 U.S.C. 154(b) by 85 days.

(21) Appl. No.: 18/901,414

(22) Filed: Sep. 30, 2024

(65) Prior Publication Data

US 2026/0095366 A1 Apr. 2, 2026

(51) Int. Cl.

*H04L 41/0631* (2022.01)
*H04L 41/0604* (2022.01)
*H04L 41/0654* (2022.01)

(52) U.S. Cl.

CPC ...... *H04L 41/0631* (2013.01); *H04L 41/0618* (2013.01); *H04L 41/0654* (2013.01)

(58) Field of Classification Search

CPC ............. H04L 41/0631; H04L 41/0618; H04L 41/0654; H04L 12/1827; H04L 41/06; H04L 41/507; H04L 51/043; H04L 65/1089; H04L 65/403; H04L 65/80; H04L 63/029

See application file for complete search history.

(56) References Cited

U.S. PATENT DOCUMENTS

| | | | | |
|---|---|---|---|---|
| 8,587,630 | B1 | 11/2013 | Krinsky et al. | |
| 9,749,886 | B1 | 8/2017 | Rao | |
| 11,228,519 | B1 | 1/2022 | Devarajan et al. | |
| 11,784,831 | B1 * | 10/2023 | Levy | H04L 9/3268 713/156 |

(Continued)

FOREIGN PATENT DOCUMENTS

| | | | | | |
|---|---|---|---|---|---|
| CN | 117081910 | A * | 11/2023 | H04L 41/0663 |
| JP | 5948111 | B2 * | 7/2016 | |
| WO | WO-2024244701 | A1 * | 12/2024 | H04L 63/10 |

OTHER PUBLICATIONS

International Search Report and Written Opinion mailed on Dec. 16, 2025 in corresponding PCT Application Serial No. PCT/US2025/048630.

(Continued)

*Primary Examiner* — Oanh Duong

(74) *Attorney, Agent, or Firm* — Young Basile Hanlon & MacFarlane, P.C.

(57) ABSTRACT

Data regarding real-time communications is received from devices participating in real-time communications. A firewall issue impacting a quality of the real-time communications is identified based on the data. An alert is generated in response to identifying the firewall issue. The data may indicate that the devices are not transmitting media data over User Datagram Protocol. The data may indicate that the devices are transmitting media data over Transmission Control Protocol. The data may indicate multiple Transport Layer Security certificate re-requests.

20 Claims, 15 Drawing Sheets

(56) References Cited

U.S. PATENT DOCUMENTS

| | | | |
|---|---|---|---|
| 12,177,100 B1 * | 12/2024 | Liu | H04L 67/303 |
| 2006/0072583 A1 | 4/2006 | Sanda et al. | |
| 2006/0182034 A1 | 8/2006 | Klinker et al. | |
| 2008/0250128 A1 | 10/2008 | Sargent | |
| 2010/0020715 A1 | 1/2010 | Monaco et al. | |
| 2013/0053023 A1 | 2/2013 | Meredith et al. | |
| 2013/0058238 A1 | 3/2013 | Ansari et al. | |
| 2013/0325948 A1 | 12/2013 | Chen et al. | |
| 2013/0329595 A1 * | 12/2013 | Scholz | H04L 65/80 370/252 |
| 2015/0222536 A1 | 8/2015 | Bergman | |
| 2016/0056927 A1 | 2/2016 | Liu et al. | |
| 2017/0034200 A1 * | 2/2017 | Costin | G06F 21/577 |
| 2017/0294112 A1 | 10/2017 | Kushnir | |
| 2017/0339258 A1 | 11/2017 | Momchilov et al. | |
| 2018/0046957 A1 | 2/2018 | Yaari et al. | |
| 2018/0288493 A1 | 10/2018 | Hermesh et al. | |
| 2019/0068512 A1 | 2/2019 | Papaloukopoulos et al. | |
| 2020/0267057 A1 | 8/2020 | Garvey et al. | |
| 2021/0256397 A1 | 8/2021 | Tiwari et al. | |
| 2021/0258643 A1 | 8/2021 | Park | |
| 2022/0182278 A1 * | 6/2022 | Vangapalli | H04L 41/0631 |
| 2022/0191173 A1 * | 6/2022 | Karpovsky | H04L 63/1433 |
| 2022/0210514 A1 | 6/2022 | McBeth et al. | |
| 2022/0321376 A1 | 10/2022 | Lin et al. | |
| 2023/0032769 A1 | 2/2023 | Chau | |
| 2023/0082635 A1 | 3/2023 | Pandit et al. | |
| 2023/0156069 A1 | 5/2023 | Cundall | |
| 2023/0164116 A1 | 5/2023 | Devarajan et al. | |
| 2024/0354490 A1 | 10/2024 | Chauvin et al. | |
| 2025/0118105 A1 | 4/2025 | Hirasawa et al. | |

OTHER PUBLICATIONS

Zoom Support, Getting started using the Zoom Dashboard, <https://support.zoom.com/hc/en/article?id=zm_kb&sysparm_article=KB0061622> Aug. 7, 2024, 7 pages.

Zoom Support, Dashboard for meetings and webinars, <https://support.zoom.com/hc/en/article?id=zm_kb&sysparm_article=KB0063135> Feb. 27, 2024, 8 pages.

Zoom Support, Accessing meeting and phone statistics, <https://support.zoom.com/hc/en/article?id=zm_kb&sysparm_article=KB0070504> Jan. 9, 2024, 6 pages.

Spiceworks, UDP and firewalls, <https://community.spiceworks.com/t/udp-and-firewalls/814648> Oct. 2021, 10 pages.

* cited by examiner

800

802

804

806

```
{
  "EVENT": "MEETING.PARTICIPANT_DATA",
  "EVENT_TS": 1626230691572,
  "PAYLOAD": {
    "ACCOUNT_ID": "AAAAABBBB",
    "OBJECT": {
      "UUID": "4444AAAAAIAAAAIAIAIIAI==",
      "PARTICIPANT": {
        "PARTICIPANT_ID": "1234567890",
        "DATA": [
          {
            "DEVICE": "WIN",
            "LOCATION": "NEW YORK",
            "NETWORK_TYPE": "WIRED",
            "MICROPHONE": "PLANTRONICS BT600",
            "SPEAKER": "PLANTRONICS BT600",
            "CAMERA": "FACETIME HD CAMERA",
            "DATA_CENTER": "SC"
          }
        ]
      }
    }
  },
  "CONNECTION_TYPE": "P2P",
  "PC_NAME": "MY PC",
  "DOMAIN": "MY-WORKSPACE",
  "MAC_ADDR": "00:00:5E:00:53:00",
  "VERSION": "4.4.55383.0716",
  "SIGNALING_IP_ADDRESS": "192.0.2.1",
  "SIGNALING_INTERNAL_IP_ADDRESS": "127.0.0.1",
  "SIGNALING_INTERNAL_IP_PORT": "5060",
  "AUDIO_INTERNAL_IP_ADDRESS": "127.0.0.1",
  "AUDIO_INTERNAL_IP_PORT": "5060",
  "VIDEO_INTERNAL_IP_ADDRESS": "127.0.0.1",
  "VIDEO_INTERNAL_IP_PORT": "5060",
  "AS_INTERNAL_IP_ADDRESS": "127.0.0.1",
  "AS_INTERNAL_IP_PORT": "5060",
  "DESTINATION_IP_DOMAIN": "EXAMPLE.COM",
  "DESTINATION_IP_PORT": "5000"
}
```

FIG. 8A

850

852

854

856

```
{
  "EVENT": "MEETING.PARTICIPANT_QOS",
  "EVENT_TS": 1626230691572,
  "PAYLOAD": {
    "ACCOUNT_ID": "AAAAABBBB",
    "OBJECT": {
      "UUID": "4444AAAAAIAIAIAIAIIAI==",
      "PARTICIPANT": {
        "USER_ID": "1234567890",
        "PARTICIPANT_USER_ID": "RSTUVWXYZA789-CDE",
        "EMAIL": "USER@EXAMPLE.COM",
        "QOS": [
          {
            "DATE_TIME": "2021-07-13T21:44:51Z",
            "TYPE": "AUDIO_INPUT",
            "DETAILS": {
              "BITRATE": "63 KBPS",
              "LATENCY": "134 MS",
              "JITTER": "6 MS",
              "AVG_LOSS": "0.0%",
              "MAX_LOSS": "0.0%"
            }
          },
          {
            "DATE_TIME": "2021-07-13T21:44:51Z",
            "TYPE": "AUDIO_QUALITY",
            "DETAILS": {
              "QUALITY": "GOOD",
              "QUALITY_SCORE": "4.9"
            }
          }
        ]
      }
    }
  }
}
```

FIG. 8B

IDENTIFYING FIREWALL ISSUES IMPACTING COMMUNICATION SESSIONS

FIELD

This disclosure generally relates to real-time communications, and, more specifically, to identifying issues that impair communication sessions.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8A illustrates an example of CSRI data received by a CSIS with respect to a client device joined to a communication session.

FIG. 8B illustrates an example of CSRI data that includes Quality of Service (QoS) data received by a CSIS with respect to a participant in a communication session.

DETAILED DESCRIPTION

Figure 1:
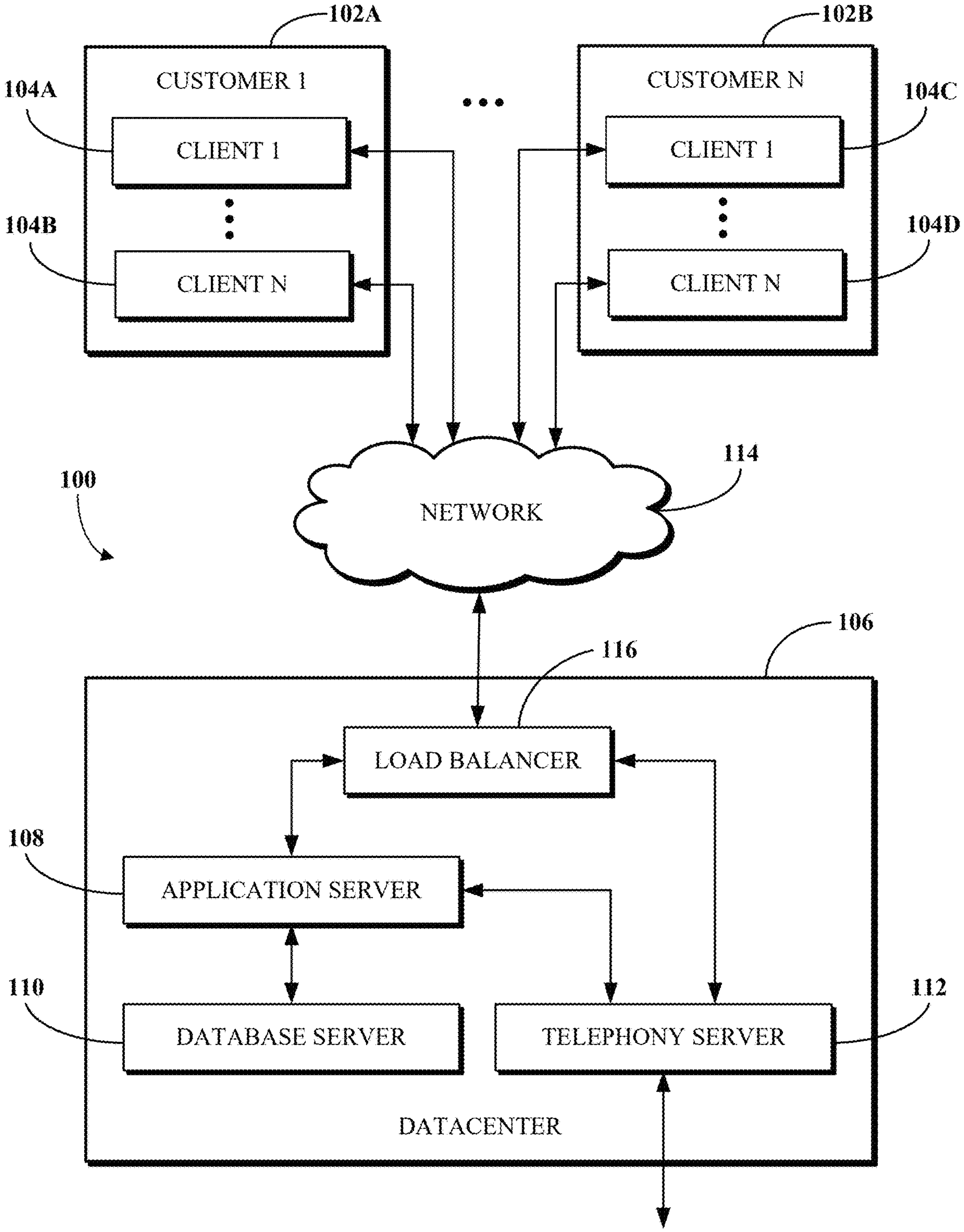
FIG. 1 is a block diagram of an example of an electronic computing and communications system.

Communication software is frequently used across various industries to support communications, such as video-enabled conferences or telephone calls, between participants in multiple locations. Communication software may be available as a standalone software product or it may be integrated within a software platform, such as a unified communications as a service (UCaaS) platform.

Communication software, such as video conferencing and phone applications, relies on a complex network of infrastructure and devices, many of which are outside the direct control of the software or platform provider. These include, but are not limited to, network routers, switches, firewalls, physical conference rooms, as well as end-user devices like laptops, smartphones, and headsets. The communication software transmits critical media data, such as voice and video, which requires seamless and uninterrupted delivery to ensure effective communication.

Degradation in the performance or misconfiguration of devices or systems involved in the generation, transmission, or reception of this data can result in compromised audio or video quality, reduced system efficiency, or even equipment failure. Such issues not only degrade the user's experience, but can also place excessive demand on network resources, cause hardware malfunctions, or trigger service outages, ultimately impacting the overall performance and reliability of the communication platform.

When devices or the infrastructure experience issues, the quality of service for the communication software can be severely impacted. For example, network latency can cause delays in audio and video, jitter can result in choppy sound, and packet loss might lead to missing pieces of conversation. The user experience is also affected by the bandwidth and stability of the users' networks, the performance of the devices involved, and the quality of the connections between them. Such factors can result in degraded call quality, dropped connections, and overall dissatisfaction with the service.

Implementations according to this disclosure address problems such as these by proactively monitoring network conditions and device performance or configuration that can degrade the user experience in audio and video communication platforms and impair the functionality of the overall network and infrastructure that supports or provides communication services. Data (i.e., CSRI) can be collected from network infrastructure components, such as routers, switches, user devices, and other devices participating in providing communications services (such a multi-media router (MMR)). The collected data can be analyzed by employing artificial intelligence (AI). The AI can be used to identify current issues and/or predict potential issues and can also identify underlying causes and suggest potential resolutions. Proactive alerts can be generated, and incident tickets can be automatically created in a ticketing system.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage)

or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for identifying issues that impair communication sessions. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
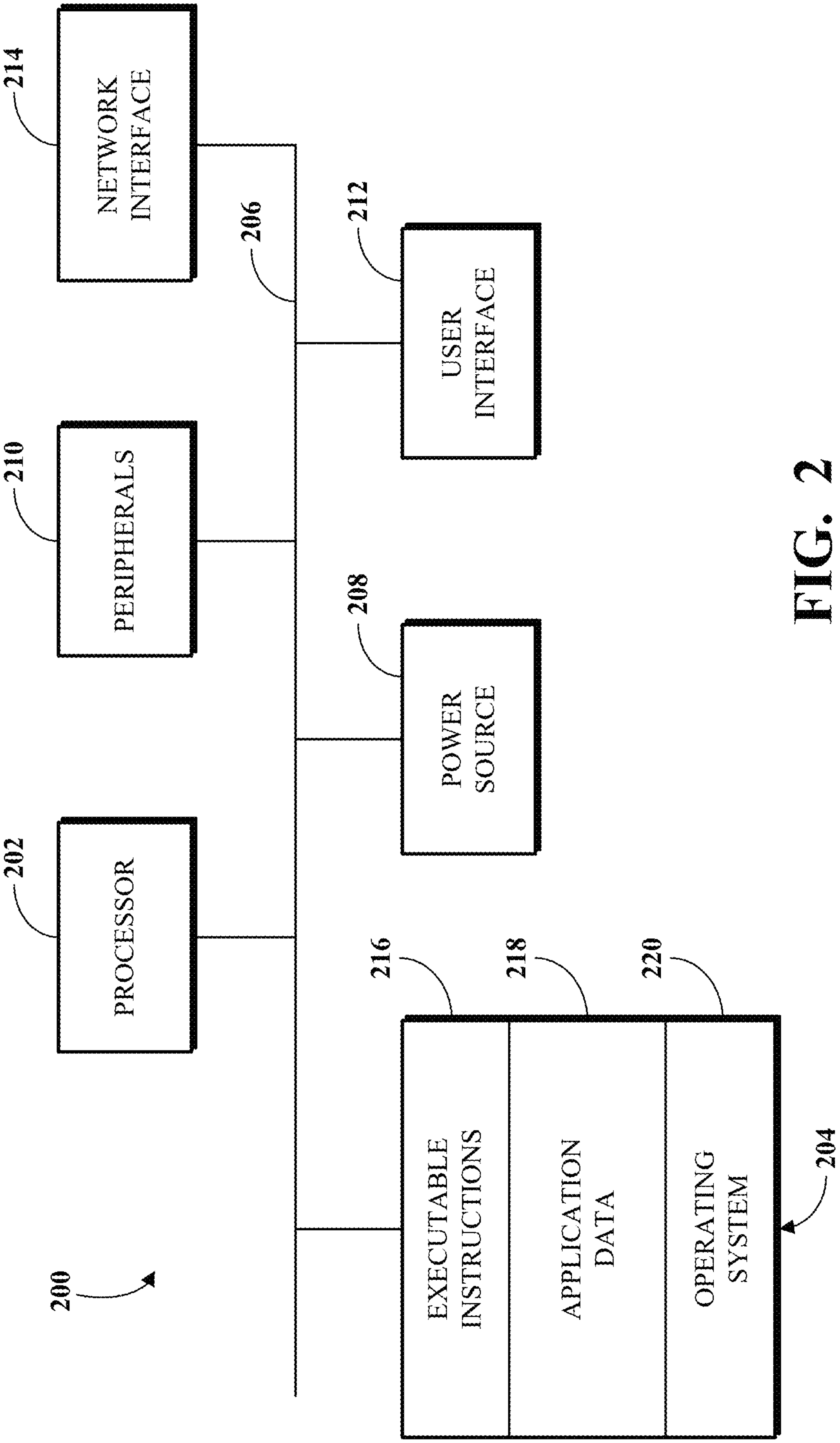
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
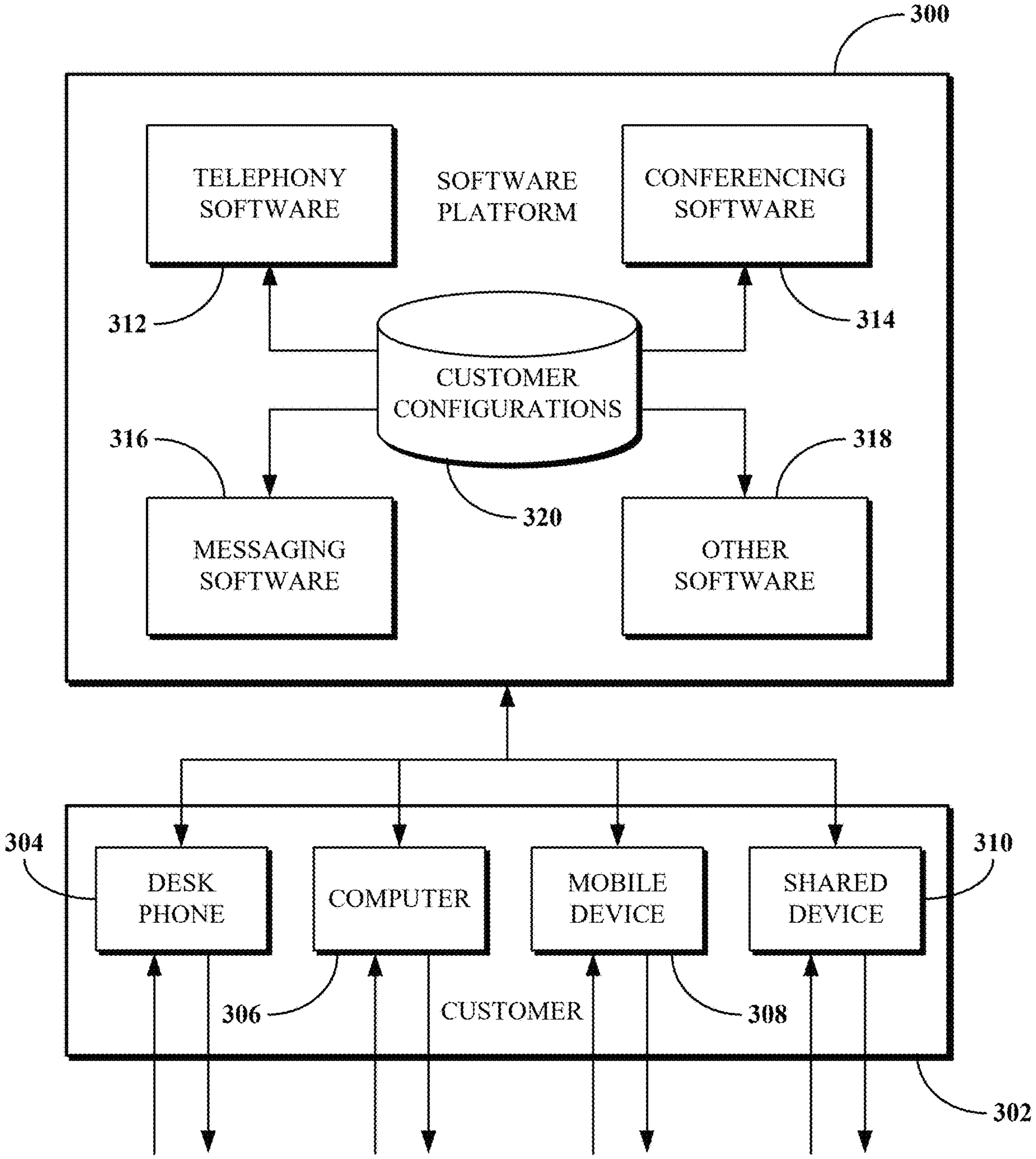
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a CSIS or software usable by a CSIS.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
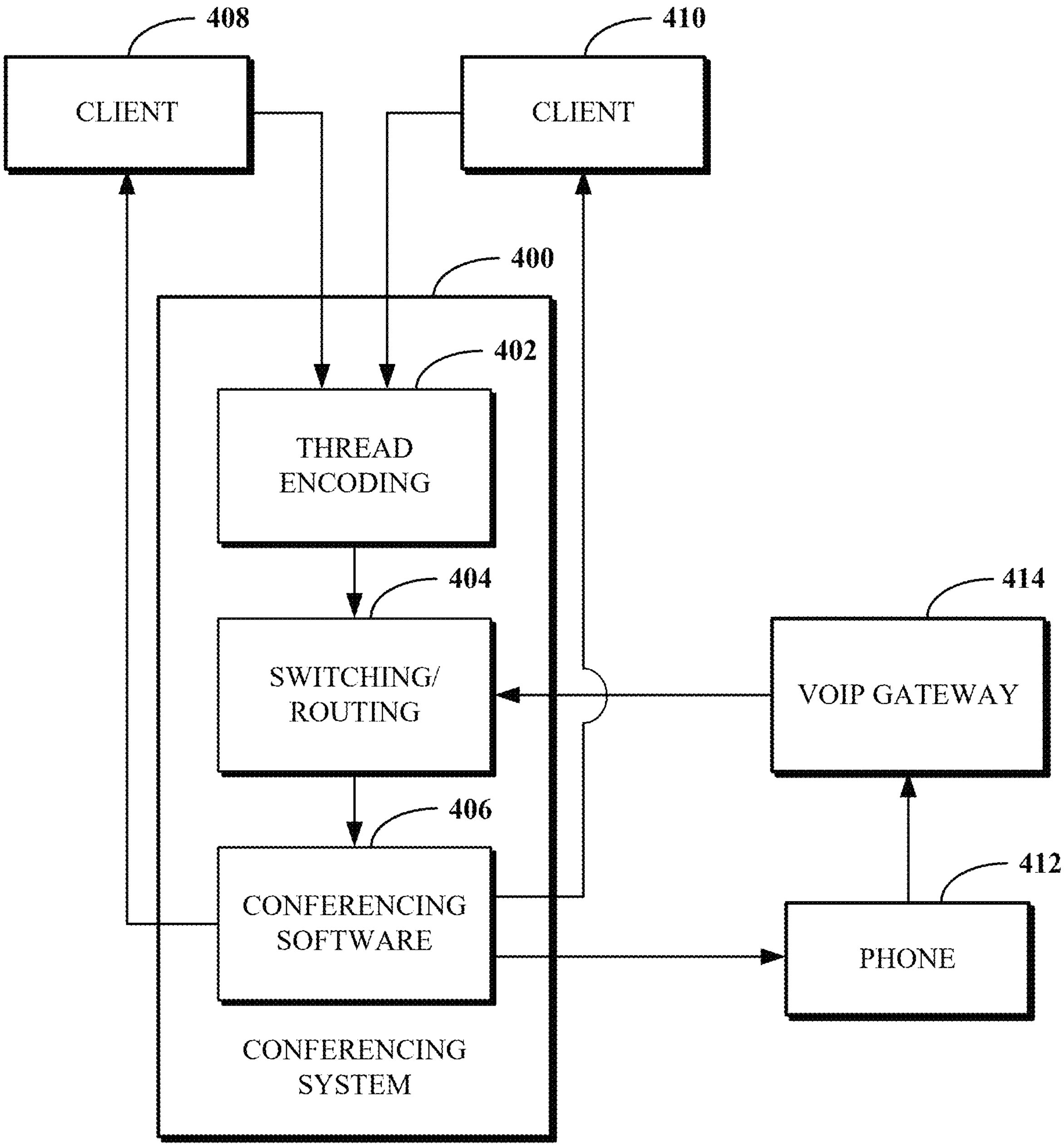
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to as an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
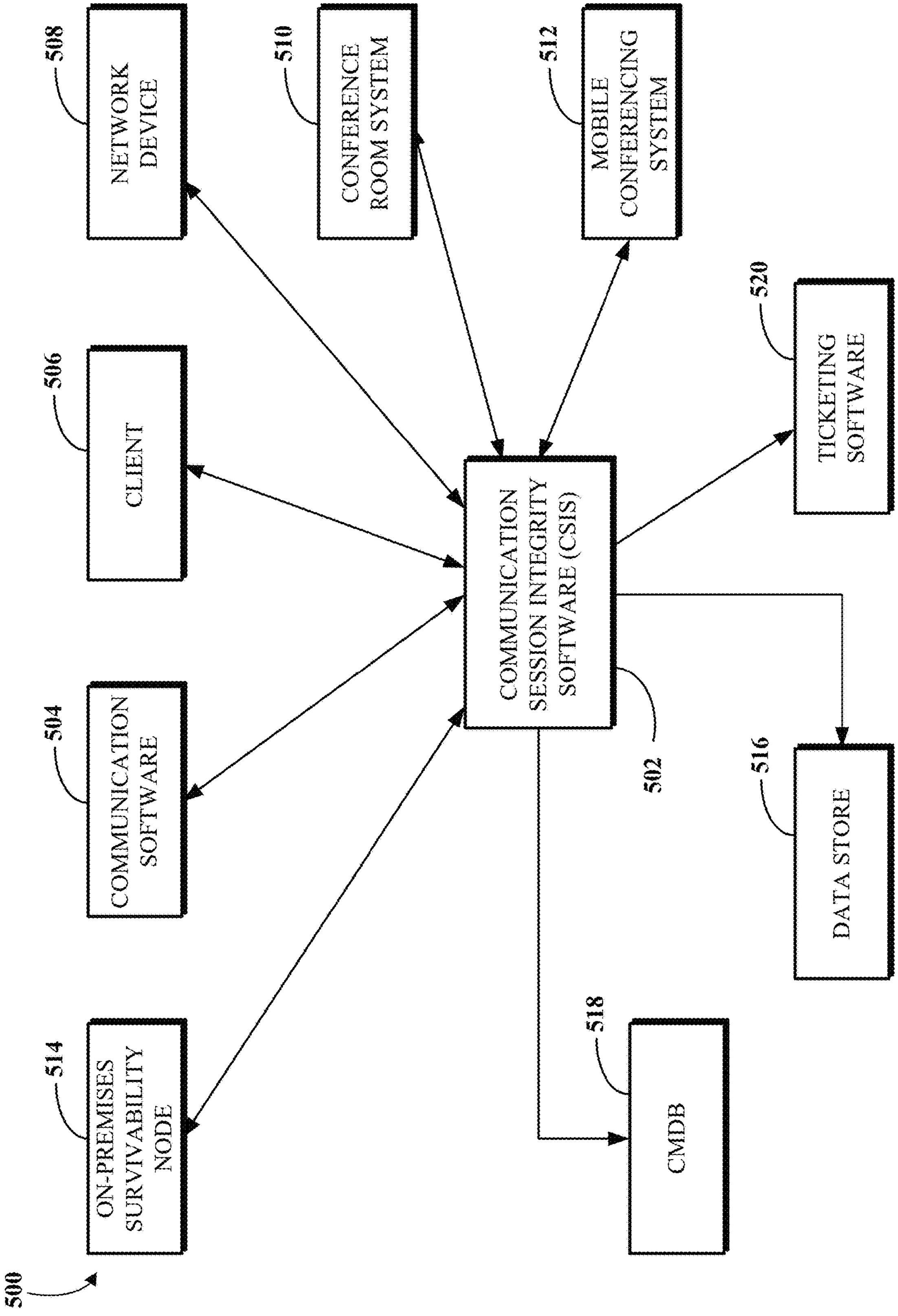
FIG. 5 illustrates a system for proactive alerting regarding degradation of communication services.

FIG. 5 illustrates a system 500 for proactive alerting regarding degradation of communication services. The system 500 includes a CSIS 502 which receives and analyzes data (i.e., CSRI) from various sources (e.g., devices, tools, and systems) within a communication environment to identify, inter alia, degradations of communication services. This CSIS 502 performs proactive issue detection and alerting, leading to high-quality communication services.

The CSIS 502 collects CSRI from multiple sources that participate in or contribute to communication services. These sources may include communication software 504, a client 506, a network device 508, a conference room system 510, a mobile conferencing system 512, an on-premise survivability node 514, fewer sources, other sources, or a combination thereof. While, for brevity, one instance of each of these sources is shown in FIG. 5, the CSIS 502 collects data from multiple instances of these sources.

The communication software 504 can be implemented on a server and facilitates communication services such as VOIP, conferencing, messaging, and other forms of online or virtual collaboration. That is, the communication software 504 hosts or enables communication sessions. The communication software 504 can be one or more of the telephony software 312, the conferencing software 314, the messaging software 316, and the other software 318 of FIG. 3. The communication software 504 can be, include, or use an MMR that manages the routing and optimization of media streams, such as voice and video, across a network.

As described above, the client 506 can be a software application or a client device. As such, the client 506 can be a computer, a smartphone, or a tablet, used by an end-users to access communication services provided by the communication software 504; or the client 506 can be a client application associated with the communication software 504.

The client 506 can be designated as a mesh parent, enabling it to distribute media streams to other devices on the same local network. Briefly, in a mesh architecture, when multiple client devices, such as devices of attendees of a webinar, are connected from the same local network, streaming media directly to each user can place unnecessary strain on the local network due to high bandwidth requirements. To reduce this load, the one or more client devices can be designated as mesh parent devices. The mesh parent devices receive the media streams and then redistribute the media streams to other client devices, referred to as mesh children, within the local network. Mesh parents may be automatically selected based on their performance and network conditions. Thus, mesh-based distribution of media streams can improve network efficiency without compromising the user experience.

The network device 508 can be or include a router, a switch, and/or a firewall that handles communication traffic, which refers at least to media data, such as voice and video data, typically exchanged during communication sessions.

Routers determine the most efficient paths for media data across a network such that voice and video packets are delivered with minimal latency. Routing may prioritize sending packets over the least congested and most direct routes and dynamically monitor and adjust these paths to avoid bottlenecks or outages that could disrupt communication. Switches manage the internal routing of media data within local networks or network segments, which is particularly important in environments with multiple devices, such as corporate networks. Firewalls secure media data as it moves through the network by detecting malicious activity or unauthorized access, while also ensuring that essential voice and video packets are not unnecessarily delayed. A firewall can be configured to prioritize communication traffic to ensure that real-time delivery of voice and video data is not interrupted by security checks. A firewall may also be programmed to allow or block specific traffic types based on protocols, enhancing both security and the continuity of uninterrupted communication sessions.

The conference room system 510 is a dedicated physical space equipped with integrated video conferencing hardware and software, designed to facilitate seamless communication for group meetings. The conference room system 510 includes pre-installed audio and video equipment, such as cameras, microphones, and speakers, that may be hardwired into the conference room. The conference room system 510 may enable users to start, control, or join communication sessions (e.g., virtual meetings) with minimal effort, often through a one-touch interface. The conference room system 510 can be configured to enhance the experience of communication sessions by automatically adjusting for factors such as audio quality and participant visibility, ensuring that both in-person and remote participants can effectively engage in the communication session. The conference room system 510 can be deployed in environments such as offices, classrooms, or other meeting spaces where frequent and high-quality video communication is necessary.

The mobile conferencing system 512 is a portable video conferencing setup designed to facilitate communication sessions in various, non-fixed environments. The mobile conferencing system 512 integrates essential audio and video hardware, including cameras, microphones, speakers, and display screens, into a mobile unit that can be easily transported between locations, such as between rooms of patients in a hospital. A mobile conferencing system allows users to start, control, or join virtual meetings with minimal effort, often through an intuitive touch interface. Unlike stationary setups (e.g., the conference room system 510), the mobile conferencing system 512 is not confined to a fixed space.

The on-premises survivability node 514 is a local (e.g., on-premises) server or appliance providing communication services within an organization's private network. In this context, "survivability" refers to the node's ability to maintain essential communication services during disruptions or outages, such as when the primary cloud-based platform is unavailable or when the network connection between the premises and the cloud-based server is operating below acceptable thresholds (e.g., in terms of download speed, upload speed, ping time, or latency). In survivability mode, the on-premises survivability node 514 ensures that communication services (e.g., telephony and virtual meetings) can be sustained by leveraging on-premises hardware and software, mitigating service disruption during cloud outages or degraded network performance.

The CSIS 502 collects the CSRI from the various sources. Some of the CSRI may be pushed to the CSIS 502 and some other CSRI may be pulled by the CSIS 502. The collected CSRI encompasses various aspects of the network performance, device health, media transmission quality, environmental conditions, and other data that can be used to evaluate the overall communication experience.

The collected CSRI can be stored in a data store 516 for further analysis and historical reference (e.g., prediction). The CSIS 502 uses the CSRI to generate alerts about current conditions and alerts about predicted undesirable conditions. Alerts can notify administrators of ongoing or imminent problems affecting the communication environment, such as hardware malfunctions, network congestion, or environmental issues degrading the user experience. The CSIS 502 also uses trends in historical data to make predictions, forecasting potential future problems such as device failures or network overloads, thereby enabling proactive preventive measures.

The CSIS 502 may integrate with (e.g., use data from) a CMDB 518. The CMDB 518 may include detailed information about an organization's information technology (IT) infrastructure, including device inventories, software versions, network topology, and service dependencies. To illustrate, network mapping data stored in the CMDB 518 may be used to identify a physical location of a user device (e.g., the client 506) given the IP address of the user device. Additionally, by referencing data in the CMDB 518, the CSIS 502 can contextualize the information it collects, identifying potential misconfigurations, outdated devices, or other factors that might contribute to communication issues. For instance, the system may identify that a device's firmware is out-of-date, prompting a recommendation to update the firmware to prevent compatibility or security issues.

Once an issue (e.g., a device-related issue or an environmental issue) affecting the communication services provided by the communication software 504 is identified, either through real-time data analysis or predictive analytics, the CSIS 502 generates and transmits alerts to users or administrators. Additionally, these alerts can be sent to a ticketing software 520, where a technical support ticket is automatically created. As such, the CSIS 502 causes the issue to be documented, tracked, and assigned to the appropriate team for resolution, thus streamlining the resolution process and minimizing downtime.

In some implementations, at least some of the collected data can be used to identify issues unrelated to communication quality or communication experience. To illustrate, while monitoring ambient noise or temperature fluctuations can help detect equipment failures, such as overheating, which directly affects the communication experience, such data can also be used to flag or warn of potential unauthorized room usage.

Figure 6A:
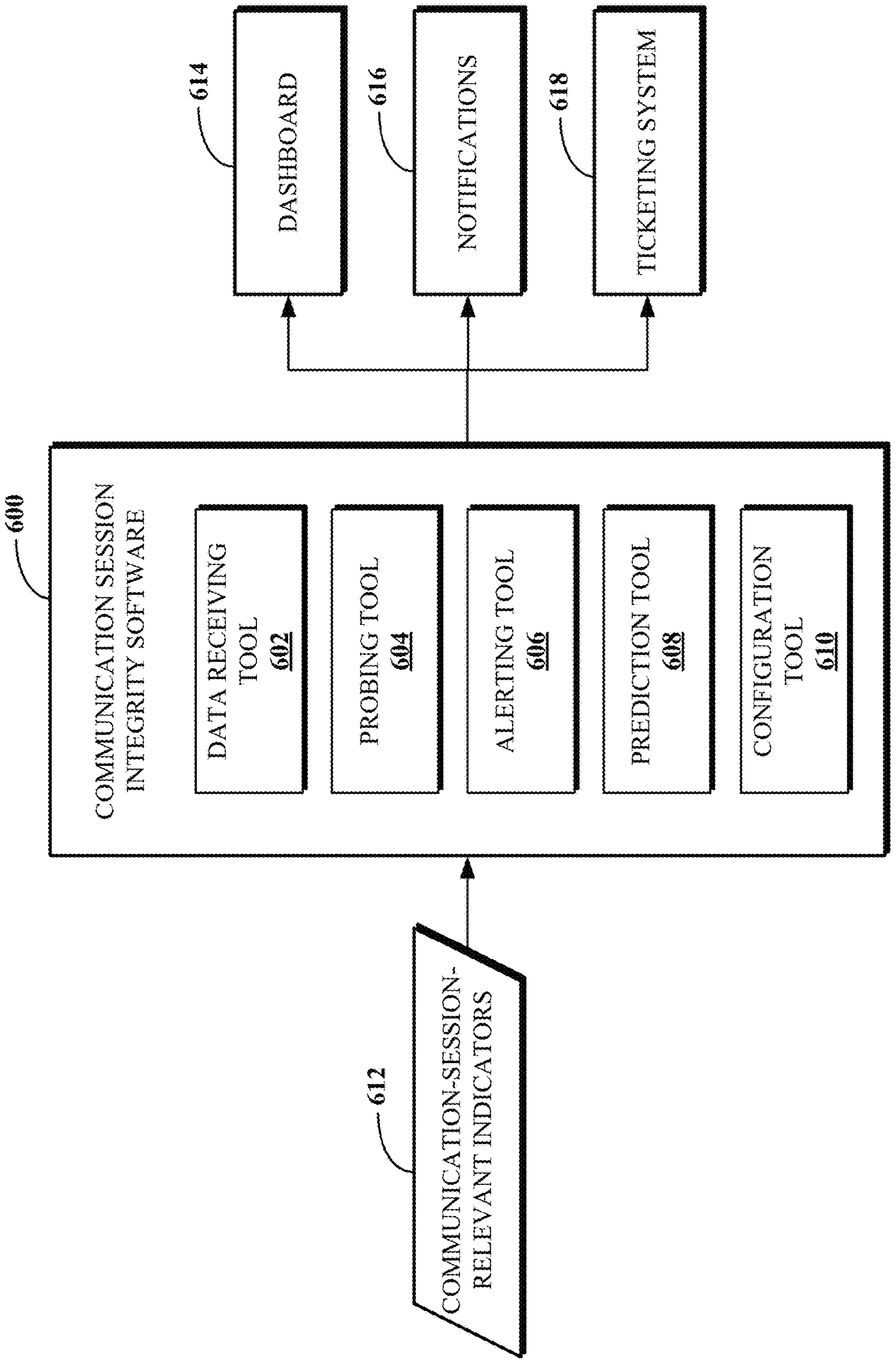
FIG. 6A is a block diagram of example functionality of a communication session integrity software (CSIS).

FIG. 6A is a block diagram of example functionality of a CSIS 600, which may be, for example, the CSIS 502 of FIG. 5. The CSIS 600 includes tools, such as programs, subprograms, functions, routines, subroutines, operations, executable instructions, and/or the like for, inter alia and as further described below, collecting, analyzing, and responding to CSRI.

At least some of the tools of the CSIS 600 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the CSIS 600 includes a data receiving tool 602, a probing tool 604, an alerting tool 606, a prediction tool 608, and a configuration tool 610. In some implementations, the CSIS 600 can include more or fewer tools. In some implementations, some of the tools may be combined, some of the tools may be split into more tools, or a combination thereof. Via the data receiving tool 602 and the probing tool 604, the CSIS 600 obtains (e.g., receives or queries for) CSRI 612. Further details of the CSRI 612 are described with respect to FIG. 6B. While not specifically detailed herein, it should be understood that, if CSRI is received from a source, the source includes facilities capable of transmitting the CSRI to the CSIS 600. Additionally, if data is polled from a source, the source includes facilities for receiving and responding to probes from the CSIS 600 to provide such CSRI.

The data receiving tool 602 is configured for collecting CSRI from various sources, including client devices, network equipment, and communication infrastructure, and other sources, such as described with respect to FIG. 5. The data can include network performance metrics, device health, and media quality, contributing to a comprehensive assessment of the overall state of the communications environment.

Client applications or devices can be instrumented to transmit network and device configuration data while participating in a communication session. This data may include the device's operating system, hardware specifications, resource utilization (CPU, memory), network configuration (IP address, network type, bandwidth), and other relevant details. Some of such fixed information (e.g., operating system and hardware specifications) may be retrieved from a CMDB.

With respect to virtual communication sessions (e.g., meetings or telephone calls), the data receiving tool 602 gathers detailed session-specific data, including participant locations, network quality indicators, and individual participant metrics. Key performance indicators (KPIs) such as bitrate (the number of bits transmitted per second), latency (the time it takes for a packet to travel between participants or between the client and the cloud), jitter (the variation in packet delay), and packet loss (the percentage of packets that fail to arrive at their destination) are also collected (e.g., received from the participant devices) to provide insights into the connection quality for audio, video, and shared content.

This data may originate from client devices or servers. Client-device-related data includes IP addresses, potentially encompassing both public and private IP addresses. A public IP address uniquely identifies a device on the internet, and a private IP address is used for communication within a local network and is not routable on the public internet. A client device typically obtains its public IP address through Network Address Translation (NAT), managed by a router. The client device can discover its public IP address using protocols such as Session Traversal Utilities for NAT (STUN) or Simple Traversal of User Datagram Protocol (UDP) through NAT (TURN), which check whether the IP address of a client device is being altered or masked by NAT devices. The public IP address can be used for establishing peer-to-peer connections in VOIP and real-time communication applications.

The data receiving tool 602 may collect (e.g., receive or query for) Simple Network Management Protocol (SNMP) data from network devices. SNMP, a protocol for monitoring and managing network devices, provides indicators like packet loss, jitter, latency, bandwidth usage, and device status, which are critical for assessing network health. The collected SNMP data is processed by correlating it with other CSRI, such as device configuration data, network performance metrics, and media quality. That is, while SNMP data primarily focuses on network infrastructure, the CSIS 600 integrates the SNMP data with data from other data sources to provide a holistic view of the communication environment. This comprehensive analysis helps identify potential issues that could impact communication quality.

For example, SNMP data can reveal network device overload, high error rates, or packet drops. The data receiving tool 602 may receive specific data like packet routing information, bandwidth usage, and error logs from routers;

packet loss, port activity, and performance data from switches; and security events, traffic flow, and device status information from firewalls. Firewalls can also provide insights into potential misconfigurations, such as issues with deep packet inspection or improper QoS settings, which can disrupt media streams and impact the quality of video and voice communication.

The probing tool 604 actively probes devices and components within the communication environment, even during active sessions, to gather additional real-time data. These probes can be queries or requests sent to network elements, client devices, servers, survivability nodes, and other components involved in communication sessions. The probing tool 604 retrieves detailed device-specific metrics, such as processor and memory utilization, Wi-Fi signal strength, and network interface health, which can directly impact client device performance during communication sessions. The probing tool 604 may also probe the configuration information of the components it interacts with.

To illustrate, the probing tool 604 may obtain the display resolution of a conference room system, the power status of a mobile conferencing system, or the audio output settings of a connected device. The probing tool 604 may also retrieve information such as battery levels, firmware versions, or network configurations, enabling the CSIS to assess the operational state and configuration of devices for optimal performance during communication sessions.

The alerting tool 606 generates proactive alerts based on the collected CSRI. These alerts can highlight issues related to network congestion, excessive jitter or packet loss, device malfunctions, or even environmental conditions like noise or carbon dioxide ($CO_2$) levels that could negatively impact communication quality. The alerts provide detailed information, including affected IP addresses, network performance metrics, and potential root causes, aiding in troubleshooting and resolution.

The alerting tool 606 optimizes notification management by grouping alerts based on parameters like IP address ranges, session identifiers, or device types, reducing redundant notifications. For example, multiple alerts triggered by jitter, latency, or packet loss can be consolidated into a single Network Health Alert. This correlation of performance metrics across sessions or IP ranges provides a more comprehensive understanding of the communication environment.

In addition to alerts, the alerting tool 606 offers actionable resolution suggestions, which may be generated by an AI engine. For instance, if high packet loss is detected, the system might suggest adjusting QoS settings or addressing bandwidth limitations. QoS settings can mean or include parameters that control the prioritization of network traffic, bandwidth allocation, latency management, jitter control, and the assignment of specific traffic types (such as voice, video, or data) to different priority levels to ensure optimal performance for critical applications. Such recommendations help IT teams efficiently resolve issues.

The prediction tool 608 utilizes historical CSRI for predictive analytics, forecasting potential issues before they impact users. By analyzing data trends and patterns, the prediction tool 608 can anticipate recurring problems and notify IT teams in advance, allowing for proactive resolution and minimizing downtime.

To illustrate, the prediction tool 608 the prediction tool 608 may identify patterns of network disruptions at specific times or under certain conditions, transmitting alerts to IT teams to investigate and address root causes proactively. The prediction tool 608 may also detect recurring device malfunctions, predicting potential failures and suggesting replacements or repairs before they disrupt communication sessions. Additionally, the prediction tool 608 can forecast network performance issues related to bandwidth usage by analyzing concurrent sessions or data-intensive applications, enabling IT teams to allocate resources in advance to prevent bottlenecks. As such, by providing these types of predictive alerts, the prediction tool 608 enables IT teams to act before an issue escalates, ensuring a seamless communication sessions experience and minimizing downtime or service degradation.

The configuration tool 610 enables authorized personnel (e.g., administrators) to customize the behavior of the CSIS 600 by setting and adjusting rules and parameters for responding to CSRI. This adaptability ensures the CSIS meets the specific needs of an organization and functions optimally across diverse communication environments. Administrators can use the configuration tool 610 to define rules that trigger alerts, probes, or notifications based on specific conditions. These rules can be tailored to cover particular timeframes or apply to specific IP address ranges or individual devices, allowing for granular control over monitoring and alerting.

For example, rules can be configured to monitor network health for specific office locations or departments by targeting their IP address ranges. Critical devices or systems can also have specialized rules to ensure uninterrupted communication quality. Devices with unique configurations can also be closely monitored. For example, mobile conferencing systems, which may require monitoring for factors such as battery levels, network connection quality, or device performance, can have custom rules applied to ensure they are functioning optimally during communication sessions.

Administrators can also dynamically adjust alert thresholds using the configuration tool 610, adapting the system to the organization's evolving needs and preventing unnecessary alerts while maintaining robust monitoring for critical sessions.

The CSIS 600 delivers alerts and predictions through various channels, including a dashboard 614 for administrators, direct notifications 616, and a ticketing system 618 that automatically generates and logs tickets with relevant data, facilitating proactive issue resolution. In some implementations, the CSIS 600 may leverage network mapping data, if available, to identify specific locations (or sites) of devices exhibiting issues. Network mapping (or IP mapping) associates IP addresses with specific sites or locations. As such, the network mapping data enables the CSIS 600 to pinpoint the physical location of devices experiencing issues, which is crucial for effective troubleshooting and resolution.

Figure 6B:
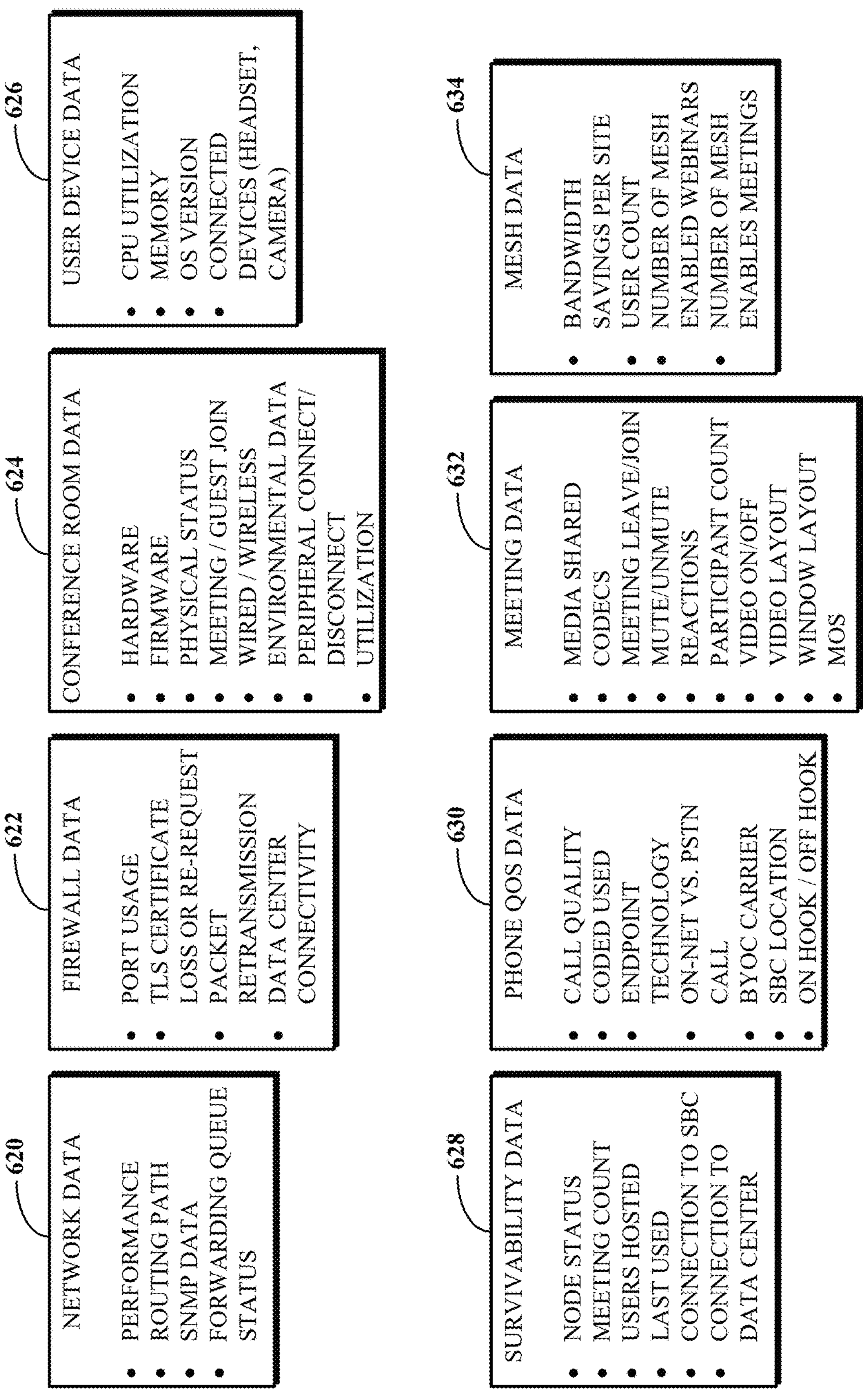
FIG. 6B illustrates examples of communication-session-relevant indicators (CSRI) that may be received by the CSIS.

FIG. 6B illustrates examples of CSRI that may be received by the CSIS 600. The CSRI may include network data 620, firewall data 622, conference room data 624, user device data 626, survivability data 628, phone QoS data 630, meeting data 632, mesh data 634, more types of data, fewer types of data, or a combination thereof.

The network data 620 includes one or more of performance metrics (such as data relating to packet loss, latency, jitter, and round-trip time (RTT)), routing paths (such as traceroute data, NAT detection data, and proxy detection data), SNMP data, and forwarding queue status data.

The performance metrics can be received from client devices participating in communication sessions. Client devices can be configured to capture such data through internal monitoring tools or network performance tracking tools. For instance, tools such as ping or iPerf can be used by client devices to measure packet loss and latency. Real-time transport protocol (RTP) may be used at client devices to calculate jitter and packet loss during communication sessions. The client devices transmit such performance data either during or at the termination of communication sessions through telemetry reports that may be sent back to the CSIS 600.

Traceroute is a diagnostic tool used to track the path packets traverse from a source (e.g., a client device) to a destination (e.g., another client device or a server) through a network. Traceroute identifies each hop the data takes along the route and measures the time taken for the data to reach each hop. Such data can be used to identify where delays, congestion, or failures are occurring in the network path. A client device may run a traceroute command during a communication session and report the results to the CSIS 600.

NAT detection identifies whether the client device is behind a NAT device. Detecting NAT can be used for determining how to establish peer-to-peer connections, especially in real-time communication sessions. As described above, NAT detection can be performed using STUN or TURN.

Proxy detection identifies whether a client device is accessing the network via a proxy server. A proxy server intermediates traffic between the client and a destination (e.g., a server). Proxy detection can be performed by inspecting network headers for signs of proxy involvement or using specialized tools that assess network behavior, such as analyzing the time-to-live (TTL) values in packets, which can indicate the presence of a proxy.

The SNMP data can be received from managed network devices like routers and switches. SNMP can be used to monitor network devices and collect information about their performance, configurations, and faults. The SNMP data may also include metrics like bandwidth usage, error rates, and system uptime, which can be used to determine proper operation of network devices during communication sessions.

Forwarding queue status data can be collected during communication sessions. Forwarding queue status data identifies the condition of the packet queues in network devices, such as routers or switches, that handle data forwarding. When packets (i.e., network traffic) arrive at a router or switch faster than the packets can be processed, the packets are temporarily stored in queues. If the queues become full or congested, packets may be delayed or dropped, causing network performance degradation. Monitoring forwarding queue status can be used for identifying congestion points in the network, as overfilled queues can result in increased latency, jitter, or packet loss. Forwarding queue status data can be collected from network devices that support SNMP or other monitoring protocols. A network device can be queried for queue length, packet drop rates, or transmission delays.

The firewall data 622 can include port usage data, Transport Layer Security (TLS) certificate loss or re-request data, packet retransmission data, and/or data center connectivity data.

The port usage data indicates whether ports have traffic passing therethrough as expected during communication sessions. Data from firewall or network perimeter devices may be queried to monitor the flow of traffic across various protocols, including TCP, UDP, Hypertext Transfer Protocol (HTTP), and HTTP Secure (HTTPS). For example, a communication application may be configured to use specific TCP ports (such as 80, 390, 443, 509, 8801, 8802, 8888, and 9090) for web-based communication and secure transmissions, and to use UDP ports (such as 3478, 3479, 8801-8810, and 8889) and dynamic ports ranging from 20000 to 64000 for real-time media transmission. If media data, which is expected to be transferred over UDP, is instead being transmitted over TCP, the CSIS 600 may transmit an alert indicating a potential firewall misconfiguration. Specifically, this could indicate that a firewall near the client device or an intermediate firewall in the network path, may be incorrectly configured to block or restrict UDP traffic.

During a communication session, a client device or a server device may need to switch communication protocols, such as from UDP to TCP, in response to network conditions or firewall restrictions. When this switch occurs, the client or server is configured to transmit specific signaling data to the CSIS 600 indicating the protocol change. For example, if media data is expected to be transferred over UDP but conditions force a switch to TCP (due to network congestion or firewall constraints), the device will transmit a signal notifying the CSIS 600 of the protocol change. The CSIS 600 may generate an alert indicating the protocol switch. The CSIS 600 may identify that the protocol switch has occurred for a number of devices within a certain IP range.

TLS certificate loss or re-request data can indicate issues in maintaining encrypted communications during a session, which may be caused by network disruptions or security mechanisms such as deep packet inspection (DPI). In some cases, DPI systems may intercept and disrupt the secure transmission of TLS certificates, causing repeated requests for the certificate. TLS certificate loss or re-request data can be received from client devices and/or other points along the communication path, such as firewalls, network security systems, or session management software. The CSIS 600 monitors for the receipt of such events, detecting abnormal patterns such as multiple certificate re-requests, which may suggest network issues or interference from DPI systems. Upon receiving such data indicating TLS certificate loss or re-requests, the CSIS 600 may generate an alert indicating potential DPI or network disruption.

Packet retransmission data indicates when packets need to be retransmitted due to loss or corruption during transit. For example, a client device or a server may transmit packet retransmission data to the CSIS 600 in response to receiving requests for retransmission of packets. Such data is important for diagnosing network instability or packet loss, which may affect communication session quality. As such, in response to receiving CSRI data indicating packet retransmission, the CSIS 600 may transmit an alert indicating the condition along with a range of IP devices experiencing such a condition.

Data center connectivity data can be used to identify the specific data center to which a client device is connected. If a client device is connected to an unexpected data center (e.g., a server that is geographically distant from the client device), it may suggest a firewall misconfiguration, either at the client device or at an intermediary firewall, which could be incorrectly routing the connection or blocking access to a more optimal data center. Additionally, the CSIS 600 can use the data center connectivity data to assess whether load balancing mechanisms are functioning properly by identifying whether communication loads are being evenly distributed across multiple data centers. This information helps ensure that performance is optimized and prevents any single data center from becoming overloaded.

The conference room data 624 can include hardware data, firmware data, physical status, environmental monitoring data, peripheral connection status, digital signage information, and people count/utilization data associated with a conferencing room system, such as the conference room system 510 of FIG. 5.

The hardware data includes details about the vendor and model of devices in the conference room data. The firmware data tracks the version and model of firmware running on the conference room equipment. The CSIS 600 can use the firmware data to determine whether devices are up to date to identify compatibility or security issues that may arise due to outdated firmware. The CSIS 600 may generate alerts related to out of data firmware. In some implementations, the CSIS 600 may cause the firmware of a device to be upgraded. In an example, the hardware data and the firmware data may be obtained from a CMDB, such as the CMDB 518 of FIG. 5.

The physical status data includes metrics such as CPU and memory usage of the devices in the conferencing room system. Monitoring CPU and memory temperature can help identify overheating issues or excessive resource usage, which may affect the performance of the communication session. The meeting data includes information about whether the system is currently hosting a communication session or if it is set up for direct guest join functionality, allowing guests to join the session without preconfigured accounts. The network connection status includes details on whether the conference room system is connected via wired or wireless networks, which can affect bandwidth, latency, and overall session quality.

The environmental monitoring data can be used to track various conditions in the conference room, including ambient noise, $CO_2$ levels, temperature, motion, and light sensor data, as well as the last-active time. By monitoring these environmental factors, the CSIS 600 can determine whether the conference room is suitable for communication sessions and can detect issues such as excessive noise or poor air quality that may interfere with the communication experience. The environmental monitoring data may be obtained during communication sessions as well as when the conferencing room system is not joined to a communication session.

The peripheral data includes the connection and disconnection status of various peripherals, such as microphones, cameras, touch panels, displays, and integration controls (e.g., relays or serial controls). By monitoring the peripheral data, the CSIS 600 can determine whether all necessary equipment is properly connected and operational during a communication session.

The associated whiteboard/digital signage status tracks the availability and status of digital displays and electronic whiteboards used in the conference room, ensuring that visual collaboration tools are functional. The people count data monitors the utilization of the room, including whether the room is currently occupied. This data helps identify when the room is in use and may also be used to optimize room scheduling and manage room availability.

In an example, the CSIS 600 can monitor CO2 levels in the conference room during communication sessions to detect elevated levels that may indicate poor air quality, which could negatively affect participants' comfort and concentration, potentially leading to discomfort, cognitive impairments, or even mild hypoxia if oxygen levels are also reduced due to inadequate ventilation. Upon detecting elevated $CO_2$ levels, the CSIS 600 may generate an alert to notify facility management or suggest actions, such as increasing ventilation by activating a heating, ventilation, and air conditioning (HVAC) system or opening a window. In some implementations, the CSIS 600 may be integrated with a building's environmental controls and can automatically trigger these adjustments to improve air quality without manual intervention. In an example, the CSIS 600 may transmit an alert to a meeting host of the communication session recommendation that a break be taken.

In another example, the CSIS 600 can use ambient noise data to detect the presence of unexpected activity in a conference room. If noise levels are detected outside of scheduled meeting times or business hours, the CSIS 600 may determine that someone is using the room without prior booking or authorization. The CSIS 600 can generate an alert to notify room managers or security personnel, prompting them to check the room. The CSIS 600 can also correlate the noise data with room occupancy sensors or video feeds from security cameras to validate whether the noise is from authorized occupants or potential unauthorized use of the room.

The CSIS 600 can also monitor the bandwidth used by both audio and video streams during a communication session. If the system identifies an unexpected spike in bandwidth usage (e.g., audio or video streams consuming more bandwidth than usual), it may indicate network issues or inefficient codec usage. The CSIS 600 can generate a notification to alert IT administrators about potential network strain or recommend adjusting the video resolution, switching to audio-only modes, or managing other bandwidth-consuming services in the room to optimize session quality. On the other hand, if no video data is detected, the CSIS 600 may transmit an alert indicating a malfunction of the camera of the conference room system.

Additionally, the CSIS 600 can analyze multiple environmental and network factors simultaneously. For example, a combination of ambient noise, temperature data, and packet loss to remote servers (e.g., to a communication server) may indicate that a fan on a device within the room is malfunctioning or failing. A sudden increase in ambient noise coupled with rising CPU or device temperature might suggest that the cooling system of the device is not functioning properly. Furthermore, packet loss detected by the CSIS 600 could further confirm that the device is overheating and impacting its network performance. In this scenario, the CSIS 600 can generate an alert to IT staff, recommending a hardware inspection or replacement of the faulty fan to prevent further degradation of the session's performance.

The user device data 626 can include information regarding the performance and status of client devices participating in a communication session. The user device data 626 can be used to ensure that devices such as laptops, desktops, tablets, or smartphones are operating optimally during the communication session and assists in detecting potential issues that may affect communication session quality. Client devices joined to communication sessions can transmit user device data to the CSIS 600. The user device data 626 received from a client device may include CPU utilization, memory usage, operating system version, and connected devices.

The CPU utilization and memory usage metrics indicate how much processing power and memory are being consumed by the client device during a communication session. High CPU or memory usage may suggest that the client device is running multiple resource-intensive applications, potentially affecting its ability to maintain a stable and high-quality communication session. The CSIS 600 can use this data to notify the user or administrators of excessive resource consumption and may suggest actions, such as closing unused applications, to free up system resources.

The operating system (OS) can be used to ensure that a device is running compatible and up-to-date software, as outdated OS versions may introduce security vulnerabilities or compatibility issues with the communication software. The CSIS 600 may generate alerts to encourage users to update their operating systems to the latest version, thereby ensuring optimal performance and security during sessions.

In addition to system performance, connected devices such as headsets, cameras, and microphones are monitored to ensure they are properly connected and functioning during the communication session, as well as being optimal for the communication session. For instance, if a headset disconnects mid-session or a camera malfunctions, the CSIS 600 can notify the user and provide troubleshooting suggestions to resolve the issue quickly.

The CSIS 600 can use the user device data 626 to provide insights into the devices and peripherals being used during communication sessions, enabling organizations to ensure optimal configurations for session quality. For example, the CSIS 600 can identify the type of headset in use, such as detecting whether a user is using a basic consumer device when a more robust, high-quality USB headset is recommended. Similarly, the software can detect whether a user is utilizing a low-quality, built-in camera instead of an organizationally approved external USB camera. By identifying the non-use of hardware that conforms to organizational policies, the CSIS 600 can ensure better audio and video quality during sessions. These insights allow administrators to take proactive measures to improve the overall user experience by ensuring that the correct peripherals and device configurations are in place.

The survivability data 628 includes data related to survivability nodes (e.g., servers and software) and communication sessions conducted (e.g., hosted) thereby. One type of survivability node can be configured on-premises to manage telephone calls, ensuring that local phone services remain operational even if the main communication infrastructure is unavailable. Another type of survivability node is used to manage audio-video communication sessions, enabling continued service for meetings in the event of a failure or disruption in the primary network.

The survivability data 628 can include node system status including key operational information regarding CPU, memory, and network usage, which can be used to determine whether the survivability node have adequate resources to function correctly. Additionally, node and service version data can be collected to confirm that the nodes are up to date and compatible with each other. For node usage, a count of meetings hosted, and the number of users hosted can be collected by the CSIS 600. This data can also include threshold measurements to alert administrators if the survivability node reaches its hosting capacity so that the node is not overloaded during high-demand periods.

The survivability data 628 can also include the last time local survivability was used, indicating when the survivability node last acted as a failover for local communication services. The connection to the SBC is also tracked to ensure that the survivability node can properly manage communication across network boundaries. Additionally, connection to the data center is monitored to verify that the survivability node is properly communicating with a central data center, which is critical for syncing data and maintaining communication integrity when the central data center is available. Additionally, connections to other node systems are tracked to ensure inter-node communication is operational, which is important for distributed communication that rely on multiple nodes to manage and sustain communication sessions.

The phone QoS data 630 can provide detailed metrics related to the quality and performance of voice calls within the communication system. The metrics can be used for ensuring that calls are clear and uninterrupted, and they help administrators diagnose potential issues affecting the overall voice communication quality. For each phone call, the phone QoS data 630 can include a call quality score, the codec used, the endpoint technology used, whether the call is on-net or a PSTN call, the carrier used, the SBC Locations/PSTN Access Points, and on Hook/off Hook. By collecting and analyzing the phone QoS data 630, the CSIS 600 enables administrators to take proactive steps to resolve voice communication issues, improve call quality, and ensure that the telephony system is functioning optimally for users The call quality score, measured using the Mean Opinion Score (MOS), reflects the perceived audio quality during the call. The MOS score can be influenced by factors such as network latency, jitter, and packet loss. A higher score typically indicates better audio quality, while a lower score may signal potential network or hardware issues. This data enables the CSIS 600 to detect and address voice quality problems.

The codec used indicates the type of codec used for compressing and decompressing the audio stream. Different codecs have different bandwidth requirements and audio quality profiles. By monitoring which codec is being used, administrators can ensure that the most efficient codec is being deployed based on network conditions and call requirements. The endpoint technology refers to the specific technology used during a telephone call, such as SIP, PSTN, or some other technology, such as a custom phone application. The endpoint technology can be used to identify how the call is being routed and managed, which can impact both quality and performance.

The on-net vs. PSTN call data distinguishes whether the call remains within an internal network (on-net) or is routed through the public telephone network (PSTN). On-net calls generally offer higher quality and better security, while PSTN calls may experience lower quality due to reliance on public infrastructure. The carrier used can be relevant for systems employing a Bring Your Own Carrier (BYOC) model, where an organization chooses its own telecommunication carrier instead of relying on a default provider. Monitoring the carrier used helps in diagnosing any quality issues that may be carrier-specific and allows administrators to address performance problems related to the carrier's network.

The SBC locations/PSTN access points data tracks the specific SBCs or access points that are involved in routing the call. This information is useful in optimizing call routing and minimizing latency, as calls routed through inefficient or distant SBCs can experience delays or quality degradation.

The on-hook/off-hook status reflects the current state of the phone during a call. If the phone is off-hook, it is actively engaged in a call, while on-hook indicates that the phone is idle. Monitoring this status helps track call engagement and detect issues related to call drops or improper phone behavior. In shared workspaces, the on-hook/off-hook status can be used by the CSIS 600 to provide insights into how often desks or workstations equipped with phones are being used. This information can help organizations optimize workspace utilization by understanding phone usage patterns.

The meeting data 632 includes various metrics and insights related to the quality and experience of communication sessions. The meeting data 632 can be used for evaluating and improving the performance of meetings, ensuring that both audio and video quality meet the required standards for participants. For each virtual meeting, the meeting data 632 includes data associated with the meeting. Some of the data associated with a meeting can be received from a server hosting the meeting, and some other data are received from each client device joined to the virtual meeting.

The meeting data 632 associated with a meeting can include voice, video, and media quality metrics, meeting leave/join events, mute/unmute status, Participant count, video on/off status, window settings, and MOS. By collecting and analyzing the meeting data 632, the CSIS 600 helps administrators and IT teams identify potential issues with audio, video, and network performance. This data provides a detailed overview of the meeting experience, allowing for proactive adjustments to improve overall meeting quality and user satisfaction. Additionally, the meeting data 632 can include data indicating usage of features (e.g., reactions) of a communication application, which may be used to cause change in application behavior.

The voice, video, and media quality metrics include data about the codecs used, the frame rate per second (fps) for video, and the overall quality of media sharing during the meeting. These metrics can be used by the CSIS 600 for assessing whether the communication infrastructure is capable of supporting smooth media transmission without excessive delays, buffering, or quality degradation. The meeting data 632 can also monitor RTT, jitter, and latency, which are key factors that affect real-time communication quality. As already mentioned, high latency or jitter can result in poor voice and video synchronization, while high round trip times may lead to noticeable delays in communication.

The meeting leave/join events indicate when participants enter or exit a meeting. Monitoring these events can help identify patterns in participant behavior, such as frequent dropouts that might indicate network issues. The mute/unmute status of participants tracks when individuals mute or unmute their microphones, which can be used to assess the interaction levels in a meeting, as frequent muting or unmuting may indicate issues such as background noise or connectivity problems.

Participant reactions during the meeting (e.g., raised hands or thumbs up) provide valuable feedback on user engagement and interaction. This data helps administrators understand participant behavior and whether they are actively involved in the communication session. Participant count tracks the number of participants attending the meeting, which can be used to analyze the scalability and resource usage of the meeting infrastructure. The participant count can be used to identify whether a communication session is underutilized or overcapacity based on the planned number of attendees.

The video on/off status monitors whether participants' video feeds are active during the meeting, which can be an indicator of video performance or participant engagement. Additionally, the video layout information tracks how participants are viewing the meeting (e.g., in speaker view, gallery view, or multi-speaker mode), giving insight into user preferences and how video streams are being consumed during the session.

The data also tracks the meeting's window settings, such as whether it is being viewed in windowed, full screen, or dual screen mode. This information helps administrators understand how participants are interacting with the session on their devices.

The MOS for the meeting provides an overall rating of the quality of the communication session. The MOS score takes into account factors like voice clarity, video quality, and network performance to provide a comprehensive measure of user satisfaction with the meeting experience.

The mesh data 634 includes metrics related to the usage and performance of mesh networking in communication systems, particularly in environments where multiple client devices are connected from the same local network. As mentioned above, in a mesh architecture, one or more client devices at a site can be designated as mesh parent devices, which receive media streams and redistribute them to other client devices, known as mesh children, within the local network. The mesh data 634 can include bandwidth savings, user count for sites not enabled with mesh, and number of mesh-enabled webinars, and number of mesh-enabled meetings.

The bandwidth savings for mesh usage per site indicates how much network bandwidth is conserved by using mesh distribution at a specific location. The user count for sites not enabled with mesh includes the number of client devices connected to a communication session at locations where mesh networking is not in use. This information helps administrators identify sites where implementing mesh networking could significantly reduce bandwidth consumption and improve the overall efficiency of media streaming. As such, the CSIS 600 can generate reports indicating bandwidth savings if mesh networking is enabled at such locations.

The number of mesh-enabled webinars provides insights into the utilization of mesh networking for large-scale events. For each mesh-enabled webinar, the number of mesh-enabled webinars can include ratio of parents to children, which reflects the number of mesh parent devices compared to mesh children. This ratio helps administrators assess the distribution of media streams across the mesh network. The number of mesh-enabled webinars can also include non-participants in mesh, identifying devices that are part of the webinar but are not utilizing the mesh network, possibly due to network constraints or configuration issues. As such, the CSIS 600 can identify devices that are bypassing the mesh network, allowing administrators to investigate and reconfigure settings to ensure optimal network usage.

The number of mesh-enabled webinars can also include the count of abandoned children, which refers to mesh children devices that were initially connected to a mesh parent but later disconnected, potentially indicating network instability or device performance issues. As such, the CSIS 600 can identify areas of network instability or device-related problems, allowing administrators to take corrective measures to improve mesh stability and performance.

The number of mesh-enabled meetings provides similar metrics for smaller, interactive sessions, such as meetings or team collaboration environments. The ratio of parents to children and the number of non-participants in mesh are tracked to ensure that the mesh network is being fully utilized and that devices are benefiting from the bandwidth-saving advantages of mesh architecture.

By collecting and analyzing the mesh data 634, the CSIS 600 allows organizations to monitor the performance and efficiency of their mesh networks. This data helps administrators identify opportunities to expand or optimize mesh usage, which can lead to significant reductions in bandwidth consumption and improved network efficiency, all while maintaining a high-quality user experience during webinars and meetings.

Figure 7:
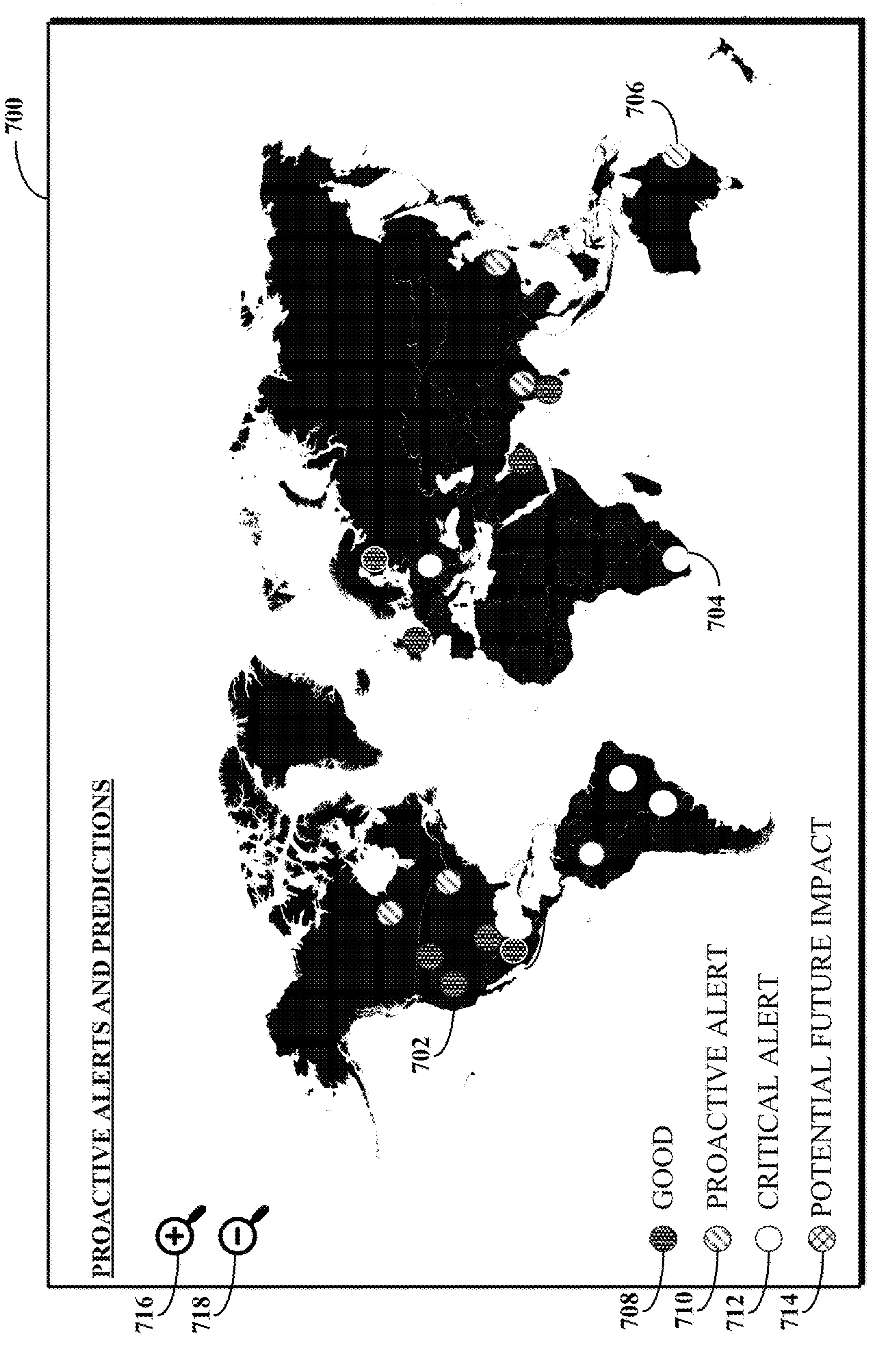
FIG. 7 is an example of a dashboard view generated by a CSIS.

FIG. 7 is an example 700 of a dashboard view generated by a CSIS, such as the CSIS 600 of FIG. 6A. The example 700 can be or can be part of the dashboard 614 of FIG. 6A.

The example 700 shows a global map with various bubbles, such as bubbles 702 through 706, overlaid thereon representing the health of communication services across different geographic regions. Each bubble on the map corresponds to a range of IP addresses or a physical or geographic location, and the pattern within the bubble reflects the number of issues detected within that range. A bubble can be filled with one of the patterns 708 through 714. Each pattern indicates a number and severity of issues (e.g., tickets or alerts) related to communication sessions within that range IP addresses.

Distinct visual patterns are used to convey the status of communication services associated with the ranges of IP addresses. The solid fill (i.e., the pattern 708) may denote regions where communication services are operating smoothly, labeled as "GOOD." The hatched pattern (i.e., the pattern 710) indicates areas with "PROACTIVE ALERTS," signifying potential issues detected that may require attention. The empty circle (i.e., the pattern 712) represents "CRITICAL ALERTS" demanding immediate action due to significant ongoing communication problems. The circle with diagonal stripes (i.e., the pattern 714) signifies "POTENTIAL FUTURE IMPACT," highlighting areas where predictive analytics forecast possible issues.

The example 700 includes zoom controls 716 and 718, enabling users to navigate the map at different levels of granularity. Zooming in allows administrators to focus on specific sites or IP address ranges for detailed analysis, while zooming out offers a broader overview of the global communication landscape, aiding in understanding overall system health.

FIG. 8A illustrates an example 800 of CSRI data received by a CSIS with respect to a client device joined to a communication session. The example 800 illustrates CSRI data that may be received from one or more sources and consolidated by the CSIS. In an example, at least some of the CSRI data of the example 800 may be received from a client joined to the communication session.

CSRI data 802 includes the type of data included in the example 800 and indicates that the data relates to a participant in a meeting, along with a timestamp (e.g., EVENT_TS). CSRI data 804 includes account and object identifiers, such as ACCOUNT_ID and UUID, which uniquely identify the session and participant. This data can be related to the meeting data 632 of FIG. 6B, which provides metadata on participants and sessions, including user identification and account details for tracking communication sessions.

The CSRI data 804 also lists device information such as the participant's DEVICE (e.g., "WIN"), NETWORK_TYPE (e.g., "WIRED"), and peripherals such as MICROPHONE, SPEAKER, and CAMERA, which can be classified as user device data. Additionally, the DATA_CENTER field indicates the server managing the communication session, which could be further analyzed under network data to identify server and routing performance.

CSRI data 806 includes connection-level details, such as CONNECTION_TYPE, SIGNALING_IP_ADDRESS, AUDIO_INTERNAL_IP_ADDRESS, and port numbers like SIGNALING_INTERNAL_IP_PORT. This network-related data could be associated with firewall data, ensuring proper routing of communication traffic, and is also tied to network data 620. For instance, internal IP addresses and ports (such as AUDIO_INTERNAL_IP_ADDRESS) allow the CSIS to monitor for routing or firewall issues, bandwidth limitations, or potential misconfigurations.

FIG. 8B illustrates an example 850 of CSRI data that includes QoS data received by a CSIS with respect to a participant in a communication session. Similar to FIG. 8A, the example 850 illustrates CSRI data that may be received from one or more sources and consolidated by the CSIS. In an example, at least some of the CSRI data of the example 850 may be received from a client device joined to the communication session, or other network infrastructure components.

CSRI data 852 includes participant and event details related to the communication session. CSRI data 854 contains QoS-specific details collected during the communication session. This includes a timestamp (DATE_TIME) for when the QoS data was recorded, as well as specific types of metrics, such as BITRATE, LATENCY, JITTER, AVG_LOSS (i.e., average loss), and MAX_LOSS (i.e., maximum loss). These network performance metrics provide insights into the quality of media data (e.g., audio and video) being transmitted during the session, helping to assess the real-time performance of the communication session. These metrics can be related to phone QoS data or network data. CSRI data 856 contains additional information related to the quality of the communication session, including a MOS. The MOS field (QUALITY_SCORE) is an industry-standard metric used to rate media quality on a scale typically ranging from 1 (bad) to 5 (excellent). The QUALITY field provides a qualitative assessment, such as "GOOD," which further helps assess the user's experience during the communication session.

Figure 9:
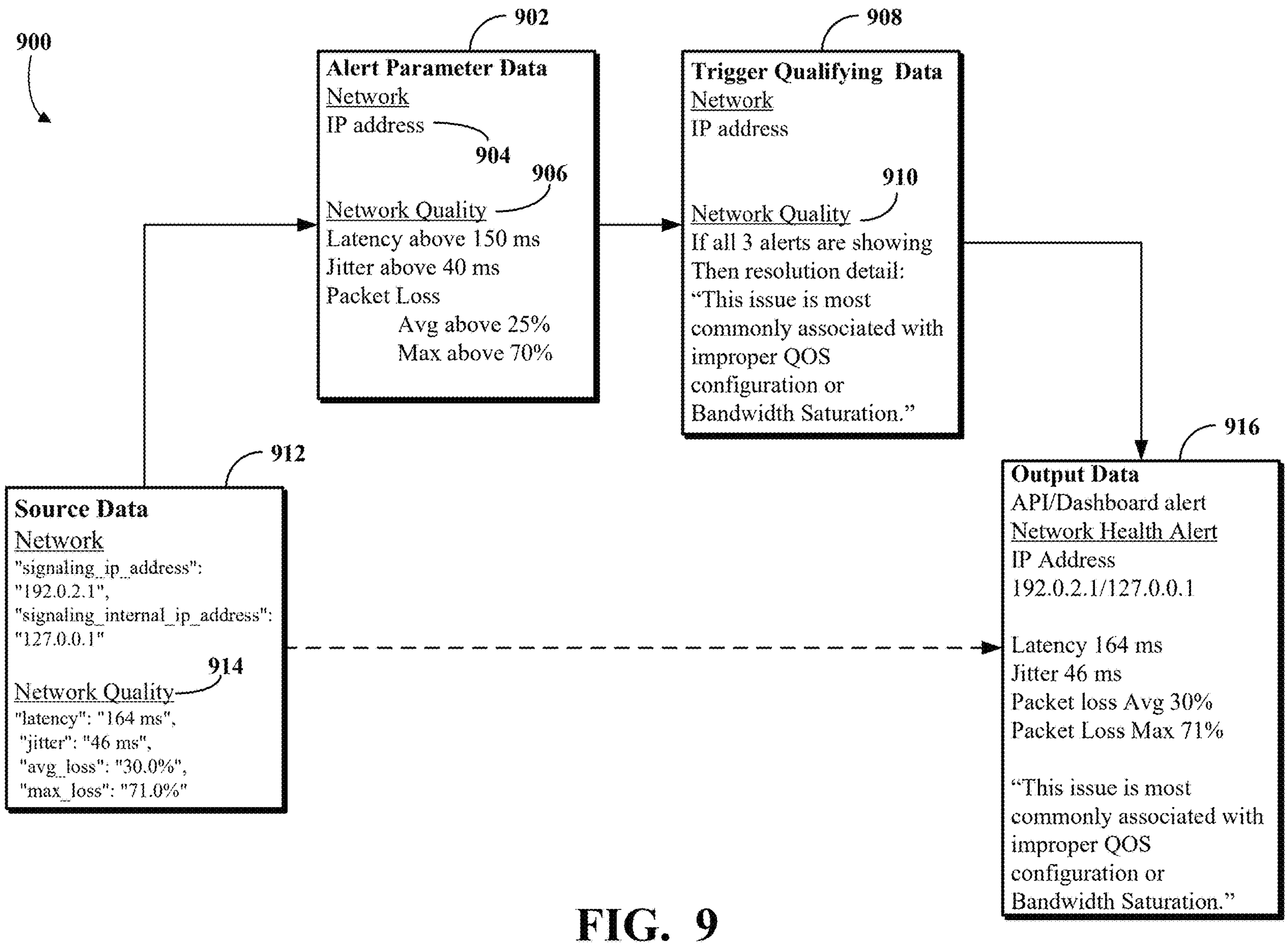
FIG. 9 illustrates an example of generating an alert by a CSIS based on received CSRI.

FIG. 9 illustrates an example 900 of generating an alert by a CSIS based on received CSRI. As described above with respect to FIG. 6A, the CSIS can be configured with rules that define conditions and thresholds for triggering alerts when specific network or communication session parameters exceed predefined limits.

Alert parameter data 902 represents a configuration rule that the CSIS uses to determine whether an alert is generated. The alert parameters include matching criteria 904 (e.g., network-related data such as an IP address) and matching conditions 906 (e.g., network quality thresholds, such as latency above 150 ms, jitter above 40 ms, average packet loss above 25%, or maximum packet loss exceeding 70%). These thresholds specify the limits that, when met or exceeded, indicate potential network or communication session issues.

Trigger qualifying data 908 works in conjunction with the alert parameter data 902. Once the matching criteria and conditions from the alert parameter data 902 are met, the trigger qualifying data 908 further qualifies the alert by applying additional logic or evaluation rules to the data. For example, the trigger qualifying data 908 specifies that if all three alerts for latency, jitter, and packet loss are triggered, a resolution detail should be generated. In this case, the resolution detail suggests that the issue is most commonly associated with improper QoS configuration or bandwidth saturation.

The relationship between the alert parameter data 902 and the trigger qualifying data 908 is that the alert parameter data 902 establishes the baseline criteria and conditions for triggering an alert, while the trigger qualifying data 908 refines the process by determining whether additional conditions are satisfied, thereby providing more specific context or recommendations for the alert. That is, the alert parameter data 902 includes network quality metrics and the trigger qualifying data 908 specifies the threshold values for these metrics that, when exceeded, will trigger an alert.

In response to receiving source CSRI data 912, which includes QoS data 914 (e.g., latency of 164 ms, jitter of 46 ms, average packet loss of 30%, and maximum packet loss of 71%), the CSIS evaluates this data against the criteria and conditions defined by the alert parameter data 902 and the trigger qualifying data 908. The CSRI determines that the source CSRI data 912 meets or exceeds the thresholds specified by the alert parameter data 902 and further qualifies the alert according to trigger qualifying data 908, which leads to the generation of output data 916.

The output data 916 represents the final alert generated by the CSIS. The alert includes critical information such as the IP address (e.g., 192.0.2.1/127.0.0.1), latency, jitter, average packet loss, and maximum packet loss, along with the resolution detail that indicates the issue may be related to improper QoS configuration or bandwidth saturation. This output can be sent to an application programming interface (API) of a ticketing system, to a dashboard, or directly to an administrator enabling network administrators to proactively address potential communication issues.

Accordingly, the CSIS can determine network health by collecting and analyzing data related to jitter, packet loss, and latency for specific IP address ranges. If the collected data indicates that metrics exceed predefined thresholds (e.g., excessive jitter, packet loss, or latency), the CSIS can generate an alert and send it to the designated API or alerting recipient. The alert can also include AI-generated resolution suggestions, such as addressing QoS configuration or bandwidth saturation issues, to help administrators proactively resolve the network problem.

As another example, the CSIS can identify firewall-related issues. For instance, the CSIS can gather data for a range of IP addresses that are transmitting no UDP packets, indicating potential misconfigurations or blockages in firewall settings. The CSIS can also collect data on TCP retransmitted packets, which could suggest packet loss or delays due to network congestion or security filtering. Additionally, the CSIS can monitor multiple TLS certificate re-requests from specific IP addresses, potentially signaling issues with secure communications or firewall inspections. Upon detecting these anomalies, the CSIS can send an alert for the affected site or IP range related to firewall health via, for example, an API to a ticketing system, a dashboard, or a notification to an administrator. The CSIS may further use AI-driven resolutions to suggest most likely causes of these issues, such as improper firewall rule configurations or overly aggressive deep packet inspections, offering actionable steps to mitigate the problem.

Figure 10A:
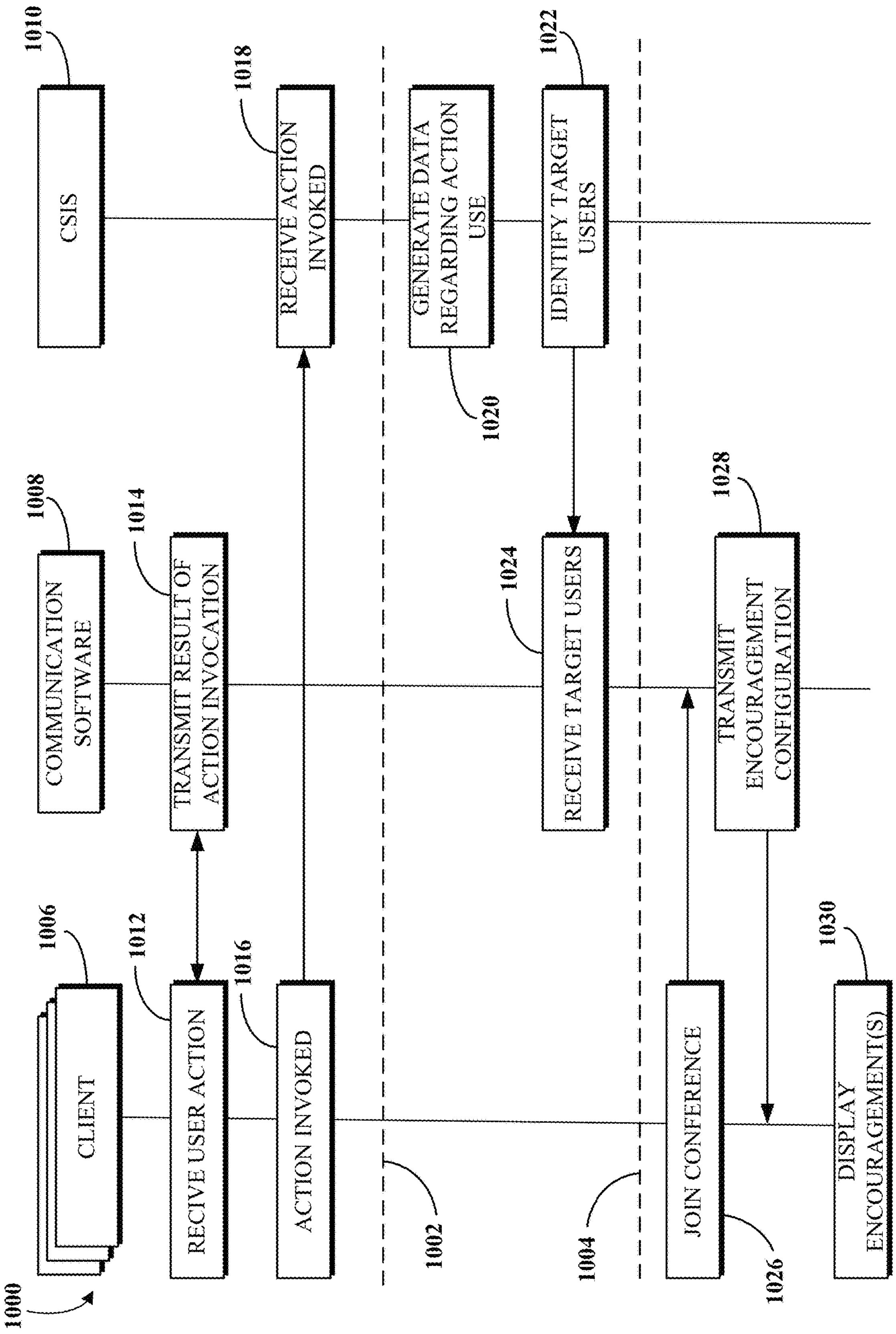
FIG. 10A is an example of a process flow for modifying behavior of a communication application based on action use.

FIG. 10A is an example of a process flow 1000 for modifying behavior of a communication application based on action use. The process flow 1000 can be separated into sub-processes that are performed at different points in time as illustrated by separations 1002 and 1004. FIG. 10A illustrates that clients 1006 (e.g., more than one client) are joined to a communication session (e.g., a virtual meeting) hosted by a communication software 1008, which can be the conferencing software 406 of FIG. 4. FIG. 10A also include a CSIS 1010 that receives CSRI from the clients 1006.

At 1012, one of the clients 1006 receives a user action from a user associated with the one of clients 1006. In an example, the user may have invoked a reaction action, as shown with respect to FIG. 10B. As such, at 1014, a video stream that includes a result of the action (e.g., that includes visual elements based on the reaction action) is transmitted by the communication software 1008 to the other clients. Additionally, at 1016, the one of the clients 1006 transmits CSRI to the CSIS 1010 indicating that the user invoked the action. In an example, the time that the action was invoked is included in the CSRI. Additional relevant data are also included in the CSRI. For example, in the case of reactions, the specific reaction (e.g., hearts, balloons, or clapping hands) is also included in the CSRI. At 1018, the CSIS 1010 receives and stores the CSRI.

At 1020, the CSIS 1010 generates data regarding action usage, which may include statistical insights on how frequently specific actions are used during a meeting or across multiple meetings. For example, if reactions are underused by participants, the CSIS 1010 can analyze the data to identify trends in reaction usage. To illustrate, the CSIS 1010 may calculate the total number of reactions used across all meetings, the reaction rate per participant (i.e., the number of reactions used by different participants over time), and the reaction frequency, which refers to the number of reactions used per minute or hour during a meeting. Additionally, the popular reaction types may be tracked by identifying the most frequently used reactions, average reactions per meeting (which can be segmented by overall usage and specific user groups), and trends in reaction usage to highlight patterns of higher or lower engagement over time. In some examples, the CSIS 1010 may generate alerts based on this data, such as "In 76 meetings today, only 15 participants used reactions," usable in proactively addressing low engagement.

At 1022, the CSIS 1010 identifies target users who are to be encouraged to increase their usage of the action (e.g., reactions). These target users may include participants who did not use reactions during meetings or those who rarely engage with the action. The target users are identified based on a determination that the action is underused. For instance, the CSIS 1010 may compare action usage against predefined benchmarks or a configured target usage level. Many organizations value social interactions among remote communication session participants, and the use of reactions in meetings is a recognized form of such interaction. As an example, the CSIS 1010 may identify a target user as someone who frequently attends meetings but either fails to or rarely (e.g., less than 1 times per 5 meetings) engages with the action. The CSIS 1010 transmits the target users to the communication software 1008. More accurately, the CSIS 1010 transmits identifiers (e.g., usernames) of the target users.

At 1024, the communication software 1008 receives the identified target users from the CSIS 1010. This information is then used by the communication software 1008 to implement encouragement strategies.

At 1026, at least some of the clients 1006 may join other communication sessions hosted by the communication software 1008. At 1028, if any of the clients 1006 are associated with identified target users, the communication software 1008 transmits encouragement configurations to these clients. An encouragement configuration causes the client to encourage the user to engage with the action. The encouragement configuration may include specific strategies, such as in-meeting virtual nudges or prompts reminding the user to interact with the action (e.g., "Show your support by using a reaction!"). Additionally, the configuration could include visual enhancements, such as enlarging or animating the icons associated with the action to draw more attention to it. In other cases, the user interface could be re-configured to more prominently display the action in a central or easily accessible location. To illustrate, at least some aspects (such as locations and sizes of action icons or buttons) of the user interface may be externalized (e.g., defined in configuration files). Thus, the configuration files may be modified to more prominently display actions to be encouraged.

At 1030, the target users receive and see encouragements displayed on their interface, encouraging them to use specific actions (e.g., reactions, raising hands, or interacting with the content) to increase engagement and interactivity during the meeting.

In an example, in addition to identifying target users based on their historical usage of the action, the CSIS 1010 or the communication software 1008 may also identify additional target users from specific user groups. These groups may include new users, who may be unfamiliar with the communication software 1008 and can be encouraged to use reactions by highlighting the feature's availability during meetings. Additionally, the target users may be identified based on roles, such as students, educators, or employees, where the use of the action (e.g., reactions) would provide added value by fostering interactivity and enhancing communication.

Figure 10B:
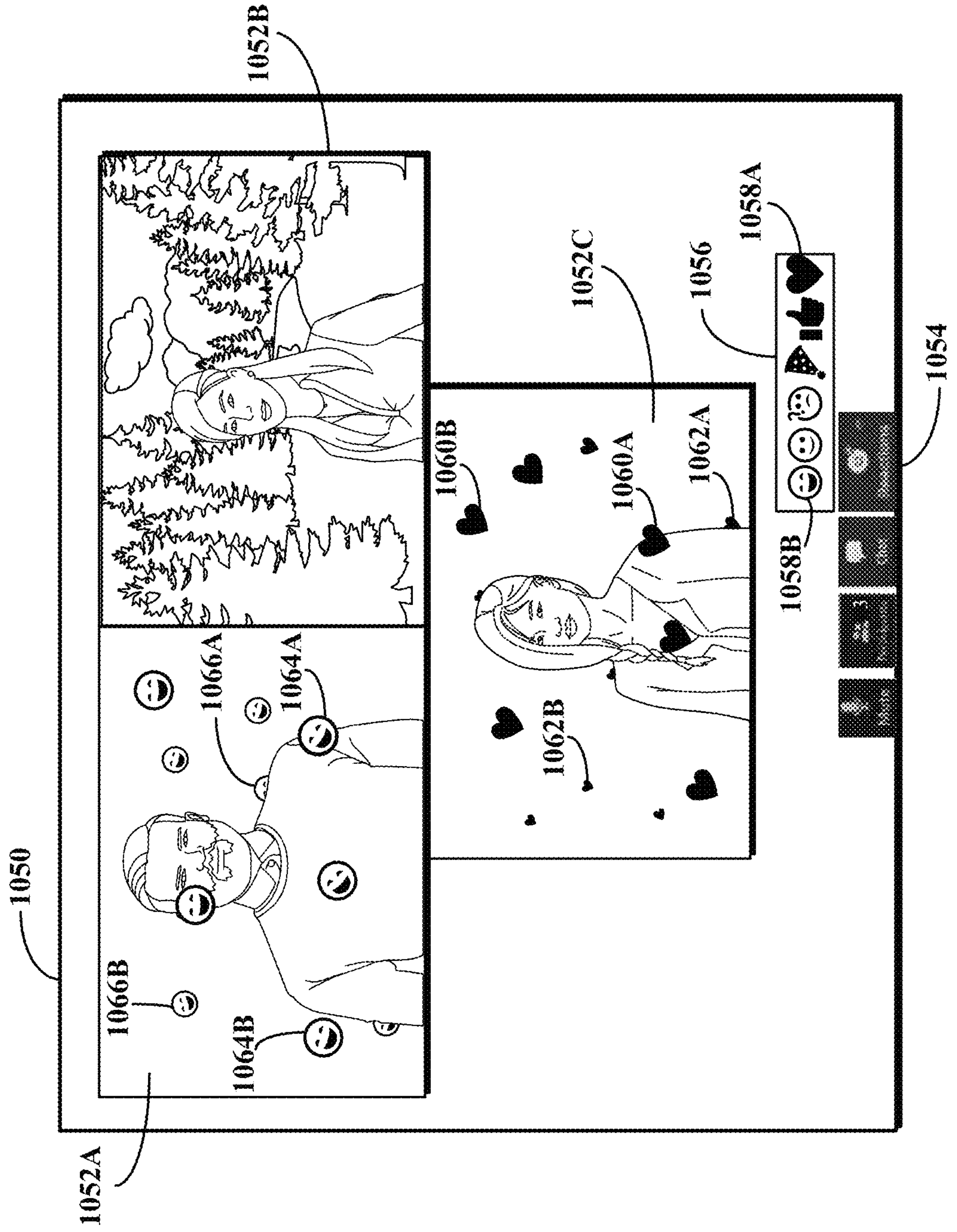
FIG. 10B illustrates an example of a conferencing user interface associated with a video conference.

FIG. 10B illustrates an example of a conferencing user interface 1050 associated with a video conference. The conferencing user interface 1050 can be displayed at a device of a conference participant, such as the client 408 or the client 410 of FIG. 4. It is noted that no specific encouragements are illustrated with respect to FIG. 10B.

The user interface 1050 shows three participants connected to the video conference, each represented by a respective tile 1052A-1052C, which includes a likeness of the corresponding participant. A control 1054 allows participants to select a reaction symbol from a set of available digital symbols 1056. Each participant's tile displays the selected symbol. FIG. 6A shows that participants associated with tiles 1052A and 1052C selected symbols 1058B and 1058A, respectively, which are displayed in their corresponding tiles as modified video streams.

In tile 1052A, digital symbol instances 1064A and 1064B (smiley faces) appear in the foreground, while instances 1066A and 1066B appear in the background. Tile 1052C shows instances 1060A and 1060B (hearts) in the foreground, with instances 1062A and 1062B in the background. Background symbols (e.g., 1062A and 1066A) are partially obscured by participant silhouettes, while foreground symbols (e.g., 1060A and 1064A) overlay the participant silhouettes. These symbols are rendered in varying sizes and layers to create depth, with larger, opaque symbols in the foreground and smaller ones in the background.

Although not shown in FIG. 6A, in subsequent video frames, the positions of the digital symbols may change, such as moving upward if associated with linear motion models. The symbols may also have different rotations or positions depending on the applied models.

Figure 11:
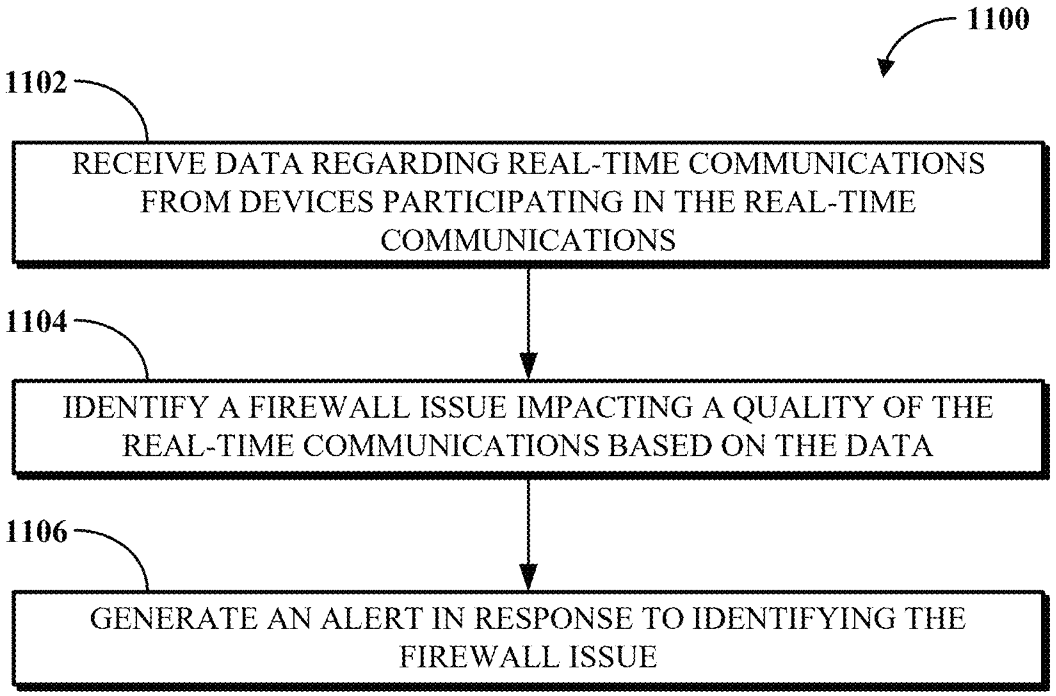
FIG. 11 is a flowchart of an example of a technique for identifying firewall issues that impact communication sessions.

To further describe some implementations in greater detail, reference is next made to examples of techniques which may be performed by or using a system for monitoring network conditions and device performance or configuration that can degrade the user experience in audio and video communication platforms. FIG. 11 is a flowchart of an example of a technique 1100 for identifying firewall issues that impact communication sessions. The technique 1100 can be executed using computing devices, such as the systems, hardware, and software described with respect to FIGS. 1-10B. The technique 1100 can be performed, for example, by executing a machine-readable program or other computer-executable instructions, such as routines, instructions, programs, or other code. The steps, or operations, of the technique 1100, or another technique, method, process, or algorithm described in connection with the implementations disclosed herein can be implemented directly in hardware, firmware, software executed by hardware, circuitry, or a combination thereof.

At 1102, data regarding real-time communications is received from devices participating in real-time communication (e.g., real-time communication sessions). The data may include information about media data transmission protocols, such as whether devices are transmitting media data over UDP or over TCP. In an example, the data can include information indicating multiple TLS certificate rerequests, which may signal an issue with the firewall.

At 1104, a firewall issue that is impacting the quality of the real-time communications is identified based on the received data. The firewall issue may include an improper firewall configuration or issues with deep packet inspection, both of which can degrade media transmission quality. The identification of the firewall issue can also be based on detecting anomalies such as blocked media transmissions due to a missing firewall rule, or identifying a mismatch between expected and actual media transmission ports. Additionally, the firewall issue can be associated with a specific protocol blocking rule or packet retransmission rates.

At 1106, an alert is then generated in response to identifying the firewall issue. The alert can contain a recommendation to resolve the firewall issue and may involve creating a ticket in a ticketing system, such as through an API. The alert can also include instructions for modifying firewall settings or indicate the location of devices affected by the firewall issue.

In some implementations, the identification of firewall issues may be based on detecting anomalies, such as blocked media transmissions or mismatches between expected and actual media transmission ports. For example, blocked media transmissions can occur when a firewall is missing a rule that allows specific types of media traffic, such as audio or video data, to pass through. Firewalls are often configured with rules to allow or block traffic on particular ports or for specific protocols like UDP or TCP. If a required rule is missing, media packets may be blocked, leading to issues such as high packet loss, jitter, or dropped calls during real-time communication sessions.

The communication monitoring software can detect this issue by analyzing packet delivery reports, such as RTP statistics, to identify unusually high levels of packet loss, which may indicate that a firewall is blocking the transmission of media data. In cases where UDP-based traffic is blocked, the software may detect that devices are attempting to transmit media over UDP, but no acknowledgment or response is being received. This lack of acknowledgment can prompt the system to flag the firewall issue as potentially related to a missing or improperly configured firewall rule. Furthermore, the software may detect that certain ports necessary for media transmission, such as standard VOIP ports like 5060 for SIP or RTP ports in the 10000-20000 range, are not responsive, indicating a blockage due to an incomplete or erroneous firewall configuration.

Additionally, mismatches between expected and actual media transmission ports can also indicate firewall issues. Media transmission, especially in real-time communication environments such as video conferencing, typically occurs over predefined ports. The communication monitoring software expects media packets to flow over specific port ranges, such as RTP ports between 16384 and 32767. If media is instead transmitted over an unexpected port, such as port 8080, which is generally reserved for HTTP traffic, the software can identify this as a mismatch. Such anomalies might occur due to a misconfigured firewall rule or deep packet inspection that reroutes traffic through unintended ports.

The system may perform deep packet inspection to verify whether the transport layer protocol being used matches the expected protocol. For example, if the system expects UDP to be used for real-time media transmission, but the media is instead being transmitted over TCP due to a firewall rule, the software can detect this as a mismatch. The use of TCP, which introduces additional latency due to connection setup and flow control, could degrade communication quality and indicate a firewall configuration issue. The system may also identify mismatches between the signaling protocol and the media transport. For instance, if a session is established using SIP signaling but the media is transmitted over an unrecognized or blocked port, the monitoring software can detect this discrepancy. SIP typically designates specific media transport ports during the session setup, and deviations from these expectations can signal a misconfigured firewall or issues with media routing caused by the firewall.

Figure 12:
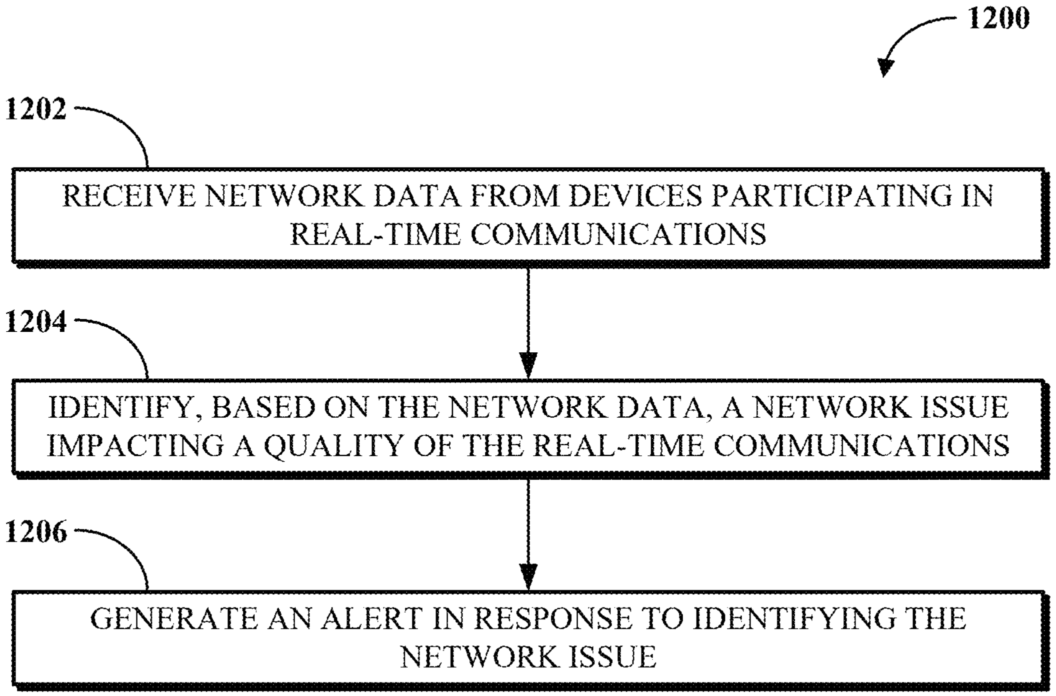
FIG. 12 is an example of a flowchart of a technique for identifying network issues that impact communication sessions.

FIG. 12 is an example of a flowchart of a technique 1200 for identifying network issues that impact communication sessions. The technique 1200 can be executed using computing devices, such as the systems, hardware, and software described with respect to FIGS. 1-10B. The technique 1200 can be performed, for example, by executing a machine-readable program or other computer-executable instructions, such as routines, instructions, programs, or other code. The steps, or operations, of the technique 1200, or another technique, method, process, or algorithm described in connection with the implementations disclosed herein can be implemented directly in hardware, firmware, software executed by hardware, circuitry, or a combination thereof.

At 1202, network data is received from devices participating in real-time communications. This network data includes a variety of performance metrics, such as latency, jitter, and packet loss, each of which can impact the quality of media transmission during communication sessions. The data may be collected continuously or periodically from devices, such as user endpoints or network infrastructure, that are engaged in ongoing communication sessions.

At 1204, a network issue is identified based on the network data. Network issues, such as high latency, packet loss, and jitter, can significantly degrade the quality of real-time communications. For example, the identification of a network issue may be based on the detection that certain metrics have exceeded preconfigured thresholds. If the latency, jitter, or packet loss exceeds their respective thresholds, the technique 1200 recognizes this as a network issue impacting the real-time communication session. This analysis can also include determining whether the network issue is related to bandwidth saturation or QoS misconfigurations.

In determining whether a network issue is related to bandwidth saturation or QoS misconfigurations, the technique 1200 can analyze various network performance metrics and behaviors associated with real-time communications. For bandwidth saturation, the technique 1200 may analyze the amount of data being transmitted over the network and compare it to the available bandwidth. If the transmitted data approaches or exceeds the available capacity, this suggests that the network is experiencing bandwidth saturation. Bandwidth saturation typically manifests as increased packet loss, jitter, and latency, which the system can detect and correlate with periods of high traffic. The technique 1200 can also analyze traffic patterns to determine if certain applications or users are consuming excessive network resources. For instance, large file transfers or video streaming might monopolize available bandwidth, resulting in degraded network performance. By comparing the current bandwidth usage with historical data, the system can identify unusual spikes in traffic and determine whether bandwidth saturation is the underlying issue.

To identify QoS misconfigurations, the technique 1200 may analyze the prioritization of traffic as defined by QoS policies. Such policies are typically designed to prioritize real-time communication packets, such as those used for voice and video. If QoS is misconfigured, critical communication traffic might not receive the necessary prioritization, leading to issues like packet delays or drops. The technique 1200 may receive data indicating whether real-time communication traffic is being correctly marked and treated according to the specified QoS rules.

In addition, the technique 1200 can receive and analyze data relating to traffic queuing behaviors. QoS policies manage how traffic is queued and transmitted, with higher-priority traffic being sent first. If the technique 1200 detects that real-time communication packets are being delayed or dropped due to lower-priority traffic consuming network resources, this can further suggest a QoS misconfiguration.

The technique 1200 can also include identifying the network issue based on a specific range of IP addresses associated with devices in the communication session. The range of IP addresses can be correlated with particular users or devices to help localize the source of the network problem. Additionally, the identification of the network issue may involve determining that the network issue impacts multiple participants or devices simultaneously, thereby identifying common points of failure within a specific network segment. This can involve analyzing network data from multiple devices to identify patterns, such as a simultaneous increase in latency or packet loss across several users connected to the same network infrastructure, such as a router or switch. By correlating the timing and nature of the issues across these devices, the technique 1200 can pinpoint a shared network component, like a misconfigured switch or congested link, as the source of the problem. Additionally, the technique 1200 can use topology information to map the affected devices to their associated network paths, further narrowing down the network segment where the failure or degradation is occurring.

At 1206, an alert is generated in response to identifying the network issue. This alert may include information about the type and severity of the network issue, such as specifying whether the issue is related to QoS settings, bandwidth limitations, or improper network routing. The alert can also include suggested remediation actions, such as adjusting bandwidth allocation or updating network configuration settings. Additionally, the alert can be transmitted to a ticketing system, which can automatically create a service ticket to resolve the identified network issue.

In some implementations, the technique 1200 may analyze routing data to identify routing loops or improper routing configurations that are contributing to the network issue. Identifying routing loops or improper routing configurations that are contributing to the network issue involves analyzing the flow of data packets across the network to ensure they are reaching their intended destination without unnecessary duplication. A routing loop occurs when packets are continuously forwarded between routers without reaching their destination, which can be detected by monitoring for repeated packet paths or excessive TTL expiration events in the network data. The technique 1200 can detect improper routing configurations by comparing expected network routes (obtained via tools such as traceroute), based on established routing tables, to the actual paths taken by data packets. If there are discrepancies, such as packets being sent through inefficient or unintended routes, the technique 1200 flags these anomalies as routing issues and correlates them with the performance degradation in the real-time communications.

The technique 1200 may also receive data from network infrastructure devices, such as routers and switches, and analyze this data to determine whether a specific malfunction in these devices is causing the network degradation. Further, the technique 1200 may evaluate network performance in different regions or segments of the communication network and apply different thresholds based on expected network conditions in those regions.

Figure 13:
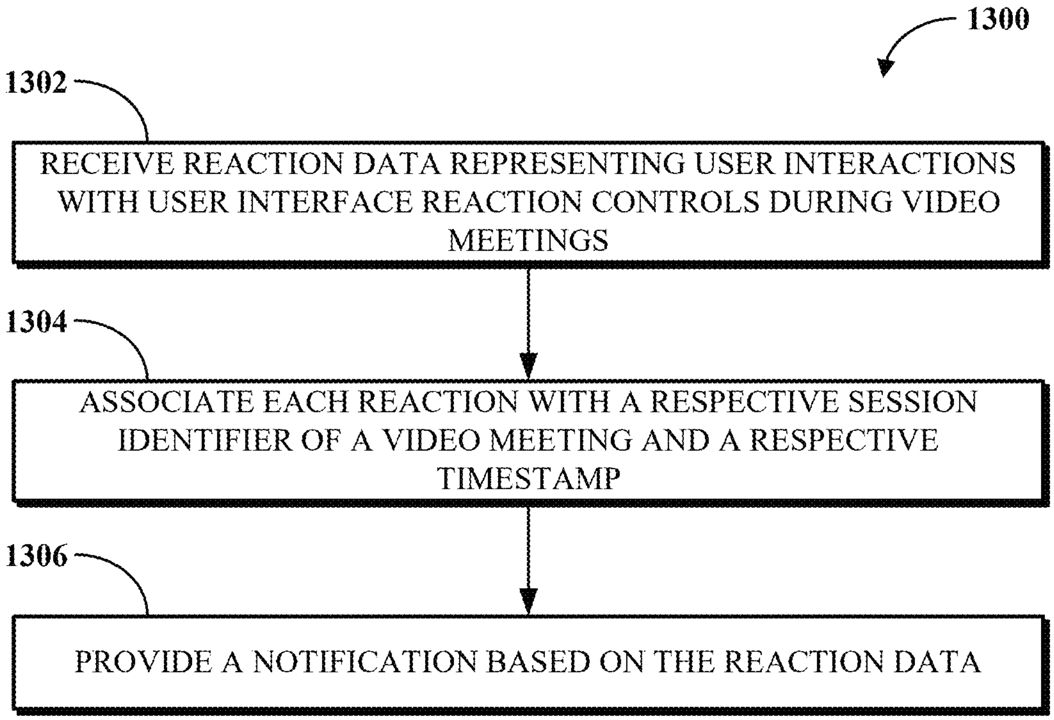
FIG. 13 is an example of a flowchart of a technique for improving reaction use in video meetings.

FIG. 13 is an example of a flowchart of a technique 1300 for improving reaction use in video meetings. The technique 1300 can be executed using computing devices, such as the systems, hardware, and software described with respect to FIGS. 1-10B. The technique 1300 can be performed, for example, by executing a machine-readable program or other computer-executable instructions, such as routines, instructions, programs, or other code. The steps, or operations, of the technique 1300, or another technique, method, process, or algorithm described in connection with the implementations disclosed herein can be implemented directly in hardware, firmware, software executed by hardware, circuitry, or a combination thereof.

At 1302, reaction data is received. The reaction data represents user interactions with user interface reaction controls during communication sessions. The reaction data includes information such as the type of reaction selected by the user (e.g., thumbs up, heart, or applause), the time when the reaction was made, and the session identifier corresponding to the communication session in which the reaction was used. In some implementations, the reaction data also includes a user identifier that links the reaction to a specific participant in the communication session.

At 1304, each reaction is associated with a respective session identifier of a real-time communication session and a respective timestamp corresponding to when the reaction occurred during the communication session. This timestamp enables the technique 1300 to accurately track the precise moment when reactions were used during the communication session, enabling detailed analysis of user engagement over time. Additionally, the reactions can be categorized based on predefined types, such as positive, neutral, and negative reactions, to allow for more granular data analysis. For example, positive reactions such as applause or thumbs up can be differentiated from neutral or negative reactions (e.g., a thumbs down), enabling the technique 1300 to assess overall participant sentiment during the session.

At 1306, a notification is provided based on the reaction data. The notification can include various types of information, such as a summary notification that indicates the number of communication sessions in which reactions were used and the number of participants who interacted with the reaction controls during the sessions. This summary can give meeting hosts or administrators insights into participant engagement during communication sessions. Additionally, the system can provide detailed counts of the number of times each type of reaction was used, enabling analysis of the popularity of different reactions during sessions. In some implementations, the notifications may include recommendations for improving participant engagement based on trends in the reaction data, such as suggestions for encouraging participants to use more reactions to foster a more interactive session.

The technique 1300 may modify (e.g., may cause a communications platform or conferencing application to modify) the user interface of the communication application based on the reaction data. For example, if the reaction data indicates that certain reaction controls are underused, the placement or size of the reaction controls may be adjusted within the user interface to make them more prominent and encourage users to interact with them more frequently.

The technique 1300 may use the reaction data to track trends in participant engagement across multiple communication sessions. For instance, by analyzing reaction data over time, the technique 1300 can determine whether certain types of meetings or events result in higher levels of participant interaction. Based on this analysis, technique 1300 can suggest adjustments to future meeting formats or content to encourage increased participation. For example, the technique 1300 can analyze patterns in reaction data across multiple meetings to identify which types of meeting formats, presentation styles, or discussion topics generate the most engagement from participants. For example, if the technique 1300 detects that meetings with interactive elements (such as Q&A sessions) consistently receive higher levels of reactions compared to more lecture-style formats, the technique 1300 can recommend incorporating more interactive components into future meetings to encourage greater participation.

The reaction data can be correlated with other meeting data, such as participant speaking time, to identify whether participants who contribute more verbally are also more likely to use reactions. By understanding these correlations, technique 1300 can provide recommendations to encourage quieter participants to engage more actively, either through reactions or verbal contributions.

Real-time feedback to meeting hosts could be provided based on the reaction data, allowing hosts to adjust their presentation or discussion strategies in response to low engagement as indicated by the reaction data. For example, the technique 1300 can prompt hosts with suggestions such as introducing interactive elements or asking for specific feedback from participants when reaction usage is low.

The reaction data can be anonymized and aggregated to generate benchmarking reports that compare engagement levels across different teams, departments, or organizations using the communication platform. The technique 1300 can then provide these reports to meeting organizers to help them understand how their team's engagement compares to industry or organizational standards.

The technique 1300 can also identify patterns in reaction use, such as whether certain demographics or roles (e.g., managers, team members, students) tend to use reactions more frequently. This insight allows technique 1300 to provide targeted recommendations for engagement strategies tailored to specific groups of participants.

Additionally, the technique 1300 can use the reaction data to implement gamification elements, such as awarding badges or points to participants who engage frequently with reaction controls.

Figure 14:
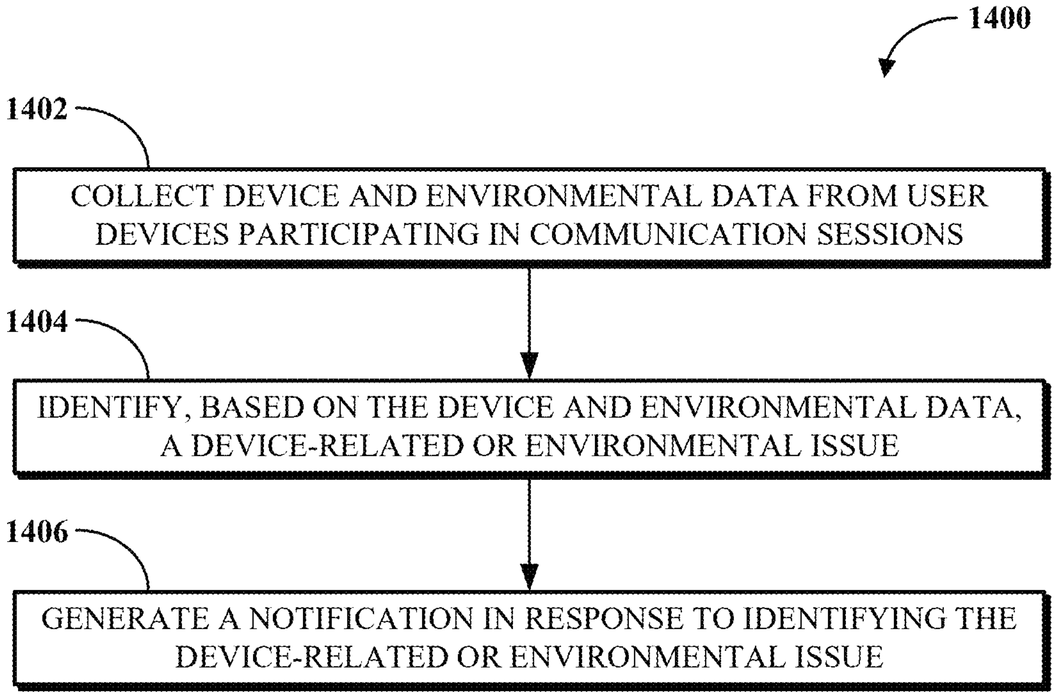
FIG. 14 is an example of a flowchart of a technique for detecting device and room problems impacting communication sessions.

FIG. 14 is an example of a flowchart of a technique 1400 for detecting device and room problems impacting communication sessions. The technique 1400 can be executed using computing devices, such as the systems, hardware, and software described with respect to FIGS. 1-10B. The technique 1400 can be performed, for example, by executing a machine-readable program or other computer-executable instructions, such as routines, instructions, programs, or other code. The steps, or operations, of the technique 1400, or another technique, method, process, or algorithm described in connection with the implementations disclosed herein can be implemented directly in hardware, firmware, software executed by hardware, circuitry, or a combination thereof.

At 1402, device and environmental data is collected from user devices participating in communication sessions. The data includes various aspects such as hardware specifications, firmware versions, processor utilization, memory utilization, ambient noise levels, and device statuses, such as battery level and network connectivity. For example, the technique 1400 may collect (e.g., receive) such data during a live session for monitoring and performance purposes. Additionally, fan speed and temperature sensor readings can also be collected from user devices. Collecting fan speed and temperature data from a device enables the technique 1400 to determine whether the device is experiencing overheating or if the fan is malfunctioning. In another scenario, ambient environmental factors, such as $CO_2$ levels, can be received. The technique 1400 can use the $CO_2$ levels to assess and ensure user comfort during communication sessions by detecting rising levels of CO2 in the environment, potentially leading to reduced air quality and poor working conditions.

At 1404, the technique 1400 identifies, based on the collected data, whether there is a device-related or environmental issue that impacts the quality of the communication session. In one implementation, the processor and memory utilization levels are analyzed, and if the utilization exceeds a certain threshold, the technique 1400 determines that a device-related issue is present. If high ambient noise is detected, the technique 1400 identifies that an environmental issue might interfere with audio quality during the session (claim 8). For instance, if a microphone or speaker is malfunctioning or if their status data indicates a problem, the technique 1400 may identify this as an audio-related issue.

At 1406, a notification is generated in response to identifying the device-related or environmental issue. The notification may suggest actions to resolve the issue, such as switching to a better network, reducing processor load, or improving environmental conditions. The technique 1400 may also notify the host to take a break if rising $CO_2$ levels are detected, improving air quality in the room. Additionally, in some implementations, if no video data is transmitted from a room, the technique 1400 generates a notification, suggesting that a camera may not be enabled.

In an implementation, identifying a device-related issue involves monitoring the processor utilization of a device during a communication session. The communications monitoring software continuously tracks (via a data received) the processor's usage and compares it against a predefined limit. This limit can be a threshold that indicates the maximum acceptable level of processor usage before device performance is likely to degrade. For example, if a device's processor utilization exceeds 80%, it might indicate that the device is overburdened and may struggle to maintain smooth operation during the communication session. The technique 1400 may further correlate high processor utilization with the performance of the communication session. This correlation is made by observing how the overuse of the processor impacts the communication session, such as causing video lag, dropped frames, audio delays, or other performance-related issues. The technique 1400 can detect these symptoms and match them to periods of high processor utilization, which helps in identifying specific device-related problems that could affect session quality.

The technique 1400 may also collect status data from the microphones and speakers of user devices during a communication session. The technique 1400 receives real-time information about whether the microphone is active, muted, or disconnected, as well as the operational status of the speakers. The technique 1400 analyzes this data to detect potential issues in the audio input or output. For instance, if the microphone is muted or not functioning properly, the technique 1400 will recognize that as an input issue, especially if the user is expected to speak during the session. Similarly, the technique 1400 can detect if the speaker is muted or if audio levels are abnormally low, indicating an output issue. The technique 1400 can also analyze the audio quality to identify problems such as feedback loops, echo, or distorted sound, which may occur due to improper microphone and speaker configurations. By analyzing these issues in real-time, the system can generate notifications or recommendations to resolve the audio input or output problems, helping users to restore proper audio functionality during the communication session.

Further uses of the device and environmental data may involve additional analysis and reporting. For example, long-term trends in device performance may be tracked to suggest hardware upgrades for users experiencing regular performance bottlenecks. Alternatively, by analyzing the network conditions, the technique 1400 may suggest relocating or adding network infrastructure, such as routers, to ensure better connectivity for future sessions. Environmental data, such as noise levels, could be used to propose improvements in the acoustics of the room or changes in the layout to reduce noise interference during meetings. Moreover, aggregated device performance data may be analyzed to identify patterns and provide tailored recommendations for specific user groups based on typical usage behavior and common issues faced during communication sessions.

For simplicity of explanation, the techniques 1100 through 1400 of FIGS. 11 through 14, respectively, are each depicted and described herein as a respective series of steps or operations. However, the respective steps or operations of the techniques 1100 through 1400 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Some implementations are described below as numbered examples (Example 1, 2, 3, etc.). These examples are provided as examples only and do not limit the other implementations disclosed herein.

Example 1 is a method, comprising receiving data regarding real-time communications from devices participating in the real-time communications; identifying a firewall issue impacting the quality of the real-time communications based on the data; and generating an alert in response to identifying the firewall issue.

Example 2 is the method of Example 1, wherein receiving the data regarding the real-time communications from the devices participating in the real-time communications comprises: receiving, from the devices, data indicating that the devices are not transmitting media data over User Datagram Protocol (UDP).

Example 3 is the method of Example 1, wherein receiving the data regarding the real-time communications from the devices participating in the real-time communications comprises: receiving, from the devices, data indicating that the devices are transmitting media data over Transmission Control Protocol (TCP).

Example 4 is the method of Example 1, wherein receiving the data regarding the real-time communications from the devices participating in the real-time communications comprises: receiving, from the devices, data indicating multiple Transport Layer Security (TLS) certificate re-requests.

Example 5 is the method of Example 1, wherein generating the alert in response to identifying the firewall issue comprises: transmitting a request to create a ticket in a ticketing system based on the firewall issue.

Example 6 is the method of Example 1, wherein identifying the firewall issue impacting the quality of the real-time communications based on the data comprises: identifying the firewall issue as one of an improper firewall configuration or deep packet inspection.

Example 7 is the method of Example 1, wherein identifying the firewall issue impacting the quality of the real-time communications based on the data comprises: identifying a firewall exhibiting the firewall issue based on a range of Internet Protocol (IP) addresses associated with the devices.

Example 8 is a system, comprising: a memory module; and processing circuitry. The processing circuitry configured to execute instructions stored in the memory module to: receive data regarding real-time communications from devices participating in real-time communications; identify a firewall issue impacting the quality of the real-time communications based on the data; and generate an alert in response to identifying the firewall issue.

Example 9 is the system of Example 8, wherein the firewall issue is associated with a specific protocol blocking rule.

Example 10 is the system of Example 8, wherein the processing circuitry is configured to identify the firewall issue impacting the quality of the real-time communications based on the data by instructions stored in the memory module to: identify the firewall issue by detecting a mismatch between expected and actual media transmission ports.

Example 11 is the system of Example 8, wherein the processing circuitry is configured to identify the firewall issue impacting the quality of the real-time communications based on the data by instructions stored in the memory module to: analyze packet retransmission rates to identify the firewall issue.

Example 12 is the system of Example 8, wherein the firewall issue is identified based on detecting deep packet inspection.

Example 13 is the system of Example 8, wherein the processing circuitry is configured to identify the firewall issue impacting the quality of the real-time communications based on the data by instructions stored in the memory module to: detect blocked media transmissions due to a missing firewall rule.

Example 14 is the system of Example 8, wherein the alert includes a recommended action for resolving the firewall issue.

Example 15 is one or more non-transitory computer-readable media storing instructions operable to cause one or more processors to perform operations comprising: receiving data regarding real-time communications from devices participating in real-time communications; identifying a firewall issue impacting the quality of the real-time communications based on the data; and generating an alert in response to identifying the firewall issue.

Example 16 is the one or more non-transitory computer-readable media of Example 15, wherein the alert comprises instructions to modify firewall settings.

Example 17 is the one or more non-transitory computer-readable media of Example 15, wherein the alert indicates a location of at least some of the devices.

Example 18 is the one or more non-transitory computer-readable media of Example 15, wherein the alert is transmitted to a ticketing system via an application programming interface of the ticketing system.

Example 19 is the one or more non-transitory computer-readable media of Example 15, wherein the data indicates that the devices are transmitting media data over Transmission Control Protocol (TCP).

Example 20 is the one or more non-transitory computer-readable media of Example 15, the operations further comprising identifying a firewall exhibiting the firewall issue based on a range of Internet Protocol (IP) addresses associated with at least some of the devices.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving data regarding real-time communications from devices participating in the real-time communications, wherein the data regarding the real-time communications comprises session reporting data transmitted by the devices to a server, the session reporting data indicating respective communication protocols used by the devices during the real-time communications, the session reporting data being separate from media data exchanged between the devices during the real-time communications;

identifying a firewall issue impacting a quality of the real-time communications based on the data; and generating an alert in response to identifying the firewall issue.

2. The method of claim 1, wherein receiving the data regarding the real-time communications from the devices participating in the real-time communications comprises:

receiving, from the devices, data indicating that the devices are not transmitting media data over User Datagram Protocol (UDP).

3. The method of claim 1, wherein receiving the data regarding the real-time communications from the devices participating in the real-time communications comprises:

receiving, from the devices, data indicating that the devices are transmitting media data over Transmission Control Protocol (TCP).

4. The method of claim 1, wherein receiving the data the regarding real-time communications from the devices participating in the real-time communications comprises:

receiving, from the devices, data indicating multiple Transport Layer Security (TLS) certificate re-requests.

5. The method of claim 1, wherein generating the alert in response to identifying the firewall issue comprises:

transmitting a request to create a ticket in a ticketing system based on the firewall issue.

6. The method of claim 1, wherein identifying the firewall issue impacting the quality of the real-time communications based on the data comprises:

identifying the firewall issue as one of an improper firewall configuration or deep packet inspection.

7. The method of claim 1, wherein identifying the firewall issue impacting the quality of the real-time communications based on the data comprises:

identifying a firewall exhibiting the firewall issue based on a range of Internet Protocol (IP) addresses associated with the devices.

8. A system, comprising:

a memory module; and processing circuitry, the processing circuitry configured to execute instructions stored in the memory module to:

receive data regarding real-time communications from devices participating in real-time communications, wherein the data regarding the real-time communications comprises session reporting data transmitted by the devices to a server, the session reporting data indicating respective communication protocols used by the devices during the real-time communications, the session reporting data being separate from media data exchanged between the devices during the real-time communications;

identify a firewall issue impacting a quality of the real-time communications based on the data; and generate an alert in response to identifying the firewall issue.

9. The system of claim 8, wherein the firewall issue is associated with a specific protocol blocking rule.

10. The system of claim 8, wherein the processing circuitry is configured to identify the firewall issue impacting the quality of the real-time communications based on the data by instructions stored in the memory module to:

identify the firewall issue by detecting a mismatch between expected and actual media transmission ports.

11. The system of claim 8, wherein the processing circuitry is configured to identify the firewall issue impacting the quality of the real-time communications based on the data by instructions stored in the memory module to:

analyze packet retransmission rates to identify the firewall issue.

12. The system of claim 8, wherein the firewall issue is identified based on detecting deep packet inspection.

13. The system of claim 8, wherein the processing circuitry is configured to identify the firewall issue impacting the quality of the real-time communications based on the data by instructions stored in the memory module to:

detect blocked media transmissions due to a missing firewall rule.

14. The system of claim 8, wherein the alert includes a recommended action for resolving the firewall issue.

15. One or more non-transitory computer readable media storing instructions operable to cause one or more processors to perform operations comprising:

receiving data regarding real-time communications from devices participating in real-time communications, wherein the data regarding the real-time communications comprises session reporting data transmitted by the devices to a server, the session reporting data indicating respective communication protocols used by the devices during the real-time communications, the session reporting data being separate from media data exchanged between the devices during the real-time communications;

identifying a firewall issue impacting a quality of the real-time communications based on the data; and generating an alert in response to identifying the firewall issue.

16. The one or more non-transitory computer readable media of claim 15, wherein the alert comprises instructions to modify firewall settings.

17. The one or more non-transitory computer readable media of claim 15, wherein the alert indicates a location of at least some of the devices.

18. The one or more non-transitory computer readable media of claim 15, wherein the alert is transmitted to a ticketing system via an application programming interface of the ticketing system.

19. The one or more non-transitory computer readable media of claim 15, wherein the data indicates that the devices are transmitting media data over Transmission Control Protocol (TCP).

20. The one or more non-transitory computer readable media of claim 15, the operations further comprising:

identifying a firewall exhibiting the firewall issue based on a range of Internet Protocol (IP) addresses associated with at least some of the devices.

* * * * *